United States Patent
Sano et al.

(10) Patent No.: US 8,539,077 B2
(45) Date of Patent: Sep. 17, 2013

(54) LOAD DISTRIBUTION APPARATUS, LOAD DISTRIBUTION METHOD, AND STORAGE MEDIUM

(75) Inventors: Takeshi Sano, Kawasaki (JP); Kazuo Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 697 days.

(21) Appl. No.: 12/633,894

(22) Filed: Dec. 9, 2009

(65) Prior Publication Data
US 2010/0185766 A1 Jul. 22, 2010

(30) Foreign Application Priority Data
Jan. 16, 2009 (JP) ................................ 2009-007143

(51) Int. Cl.
*G06F 15/173* (2006.01)
(52) U.S. Cl.
USPC ............ 709/226; 709/220; 711/162; 713/324
(58) Field of Classification Search
USPC .................. 709/226, 223; 711/162; 713/324
See application file for complete search history.

(56) References Cited

U.S. PATENT DOCUMENTS

| | | | | |
|---|---|---|---|---|
| 7,062,556 B1 * | 6/2006 | Chen et al. | ..................... | 709/226 |
| 8,176,273 B2 * | 5/2012 | Yamada et al. | ................ | 711/162 |
| 2008/0250260 A1 * | 10/2008 | Tomita | .......................... | 713/324 |

FOREIGN PATENT DOCUMENTS

| | | |
|---|---|---|
| JP | 2003-150570 | 5/2003 |
| JP | 2007-052542 | 3/2007 |
| JP | 2008-225642 | 9/2008 |
| JP | 2008-257578 | 10/2008 |

OTHER PUBLICATIONS

"Japanese Office Action" mailed by JPO and corresponding to Japanese application No. 2009-007143 on Feb. 19, 2013, with English translation.

\* cited by examiner

*Primary Examiner* — Tammy Nguyen
(74) *Attorney, Agent, or Firm* — Fujitsu Patent Center

(57) ABSTRACT

A load distribution apparatus includes: a control unit that refers to a load information storage unit that stores load values of a plurality of information processing apparatuses, selects an information processing apparatus with the load value smaller than a predetermined threshold from the plurality of information processing apparatuses, and determines the information processing apparatus with the load value smaller than a predetermined threshold as an allocation destination of processing requests until the load value of the information processing apparatus reaches the predetermined threshold; and a transmitting unit that transmits the processing requests to the allocation destination determined by the control unit.

11 Claims, 21 Drawing Sheets

FIG.7

110 MANAGEMENT INFORMATION STORAGE UNIT

111a

| SERVER MANAGEMENT TABLE | | | | | |
|---|---|---|---|---|---|
| VIRTUAL SERVER NAME : system | | | VIRTUAL IP ADDRESS : 192.168.0.10 | | |
| SERVER NAME | IP ADDRESS | STATE | LOAD VALUE | FINAL REQUEST ALLOCATION TIME | ACTIVATION PRIORITY ORDER |
| SERVER A | 192.168.0.11 | OPERATION STATE | 5 | 10:00:00 | 1 |
| SERVER B | 192.168.0.12 | OPERATION STATE | 16 | 9:00:00 | 2 |
| SERVER C | 192.168.0.13 | OPERATION STATE | 12 | 9:30:00 | 3 |
| SERVER D | 192.168.0.14 | POWER SAVING STATE | 0 | — | 4 |
| ... | ... | ... | ... | ... | ... |

FIG.13
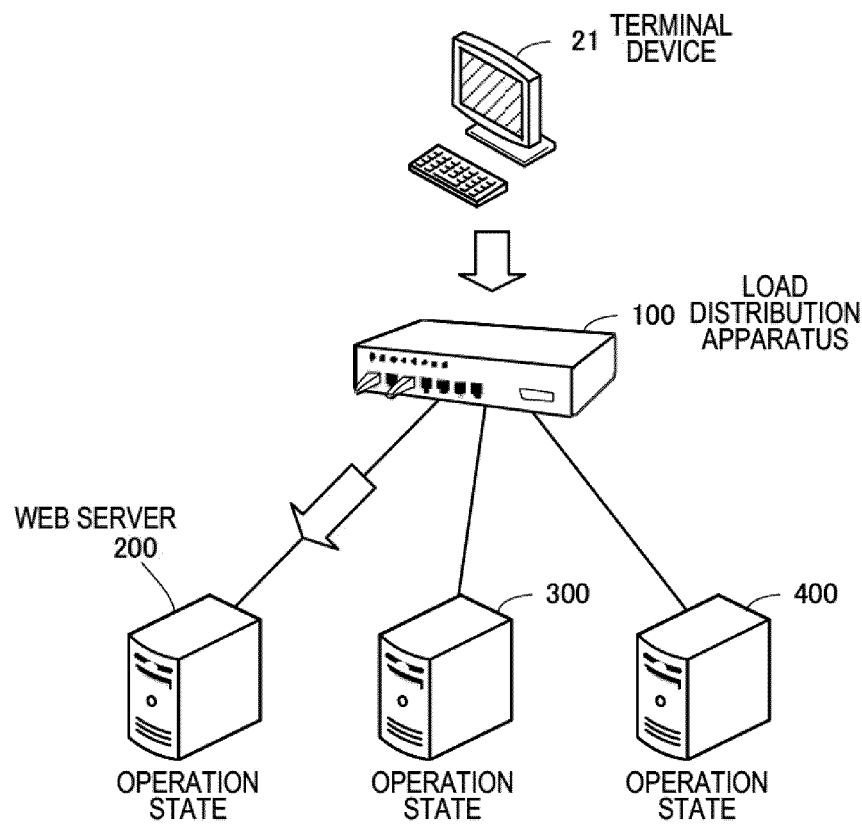
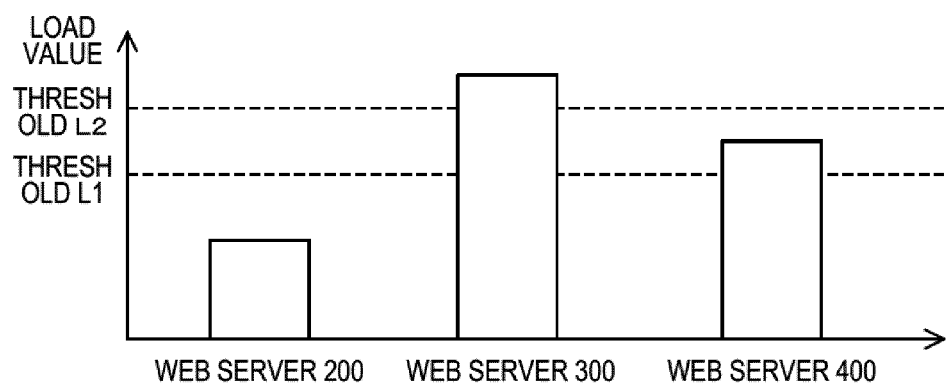

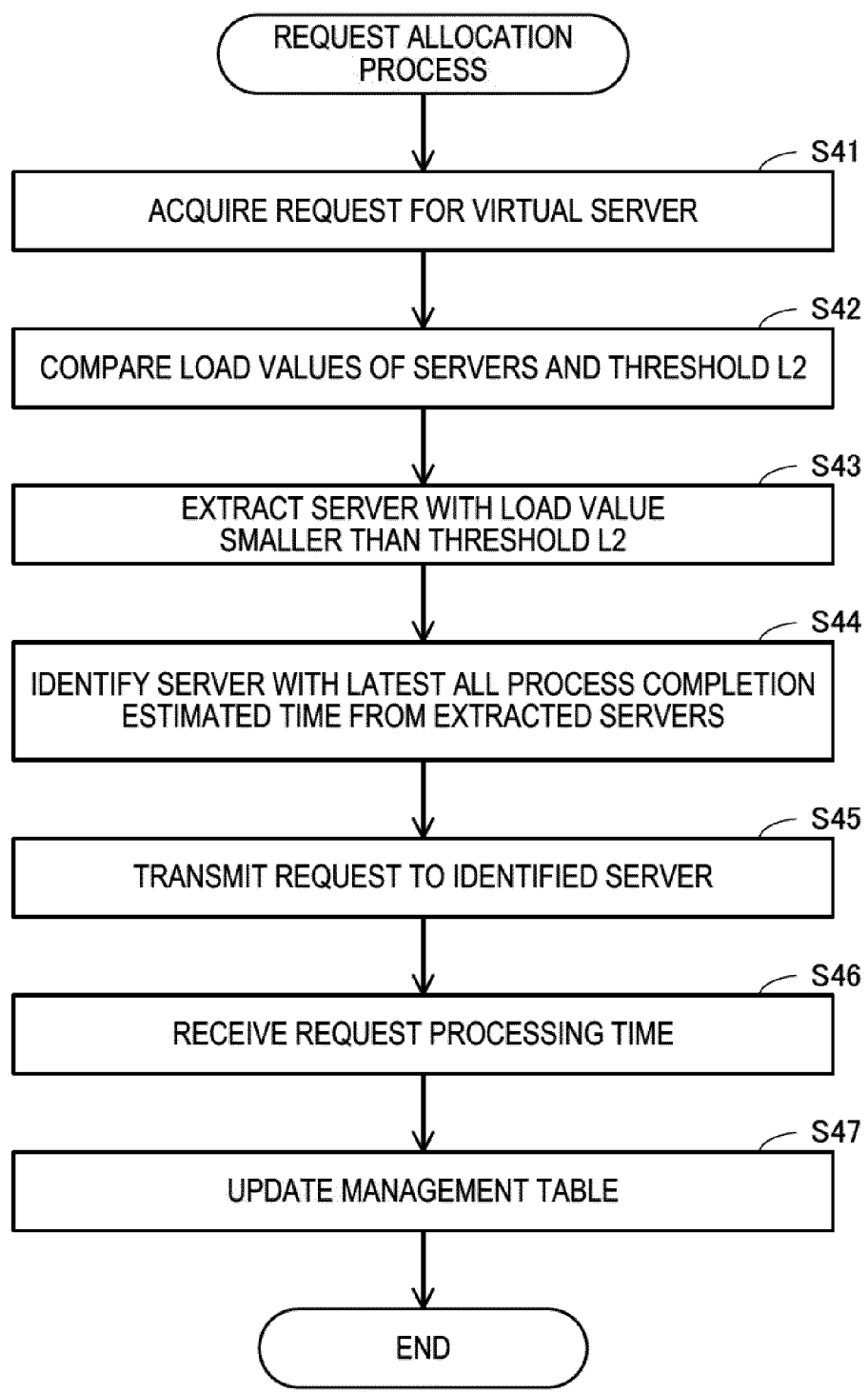

LOAD DISTRIBUTION APPARATUS, LOAD DISTRIBUTION METHOD, AND STORAGE MEDIUM

This application is based upon and claims the benefit of priority from the prior Japanese Patent Application No. 2009-7143 filed on Jan. 16, 2009, the entire contents of which are incorporated herein by reference.

FIELD

The embodiments discussed herein are related to load distribution for allocating processing requests to a plurality of information processing apparatuses.

DESCRIPTION OF RELATED ART

Conventionally, a load distribution system is used in which a plurality of servers that provide the same services are arranged, and processing requests are allocated and distributed to the plurality of servers. The load distribution system includes a load distribution apparatus. In the load distribution apparatus, a plurality of servers receive processing requests at front stages, and the processing requests are allocated to the servers so that the load of the servers is uniform.

Examples of a load distribution method of the load distribution apparatus include round robin, minimum connection, and minimum response time. The round robin is a method of sequentially allocating processes to the servers. The minimum connection is a method of allocating processes to a server with least TCP (Transaction Control Protocol) connections or UDP (User Datagram Protocol) flows. The minimum response time is a method of measuring the response time of each server and allocating processes to the server with the shortest response time. Distributing the load this way can improve the responsiveness of the servers.

Power saving is an issue in the information processing system. To deal with the issue, in the load distribution system, it is preferable to operate the minimum number of servers without impairing the responsiveness if not all servers need to be activated, and to terminate the processes of other servers to put the servers into a power saving state.

To deal with this, for example, the load status of a predetermined server can be monitored, and the load can be distributed by activating a terminated server if the load exceeds the throughput of the single server. Alternatively, the load of a relevant server or the load of all servers can be monitored, and a predetermined server can be switched to a power saving state if the load decreases below a predetermined level.

SUMMARY

According to an embodiment, a load distribution apparatus includes: a control unit that refers to a load information storage unit that stores load values of a plurality of information processing apparatuses, selects an information processing apparatus with the load value smaller than a predetermined threshold from the plurality of information processing apparatuses, and determines the information processing apparatus with the load value smaller than a predetermined threshold as an allocation destination of processing requests until the load value of the information processing apparatus reaches the predetermined threshold; and a transmitting unit that transmits the processing requests to the allocation destination determined by the control unit.

It is to be understood that both the foregoing summary description and the following detailed description are explanatory as to some embodiments of the present invention, and not restrictive of the present invention as claimed.

BRIEF DESCRIPTION OF THE DRAWINGS

FIG. 7 illustrates a second data configuration example of the server management table of the first embodiment;
FIG. 13 illustrates a first state example of the Web system;
FIG. 21 is a flow chart of a request allocation process of the second embodiment.

DESCRIPTION OF THE EMBODIMENTS

The embodiments will now be described in detail with reference to the drawings.

Figure 1:
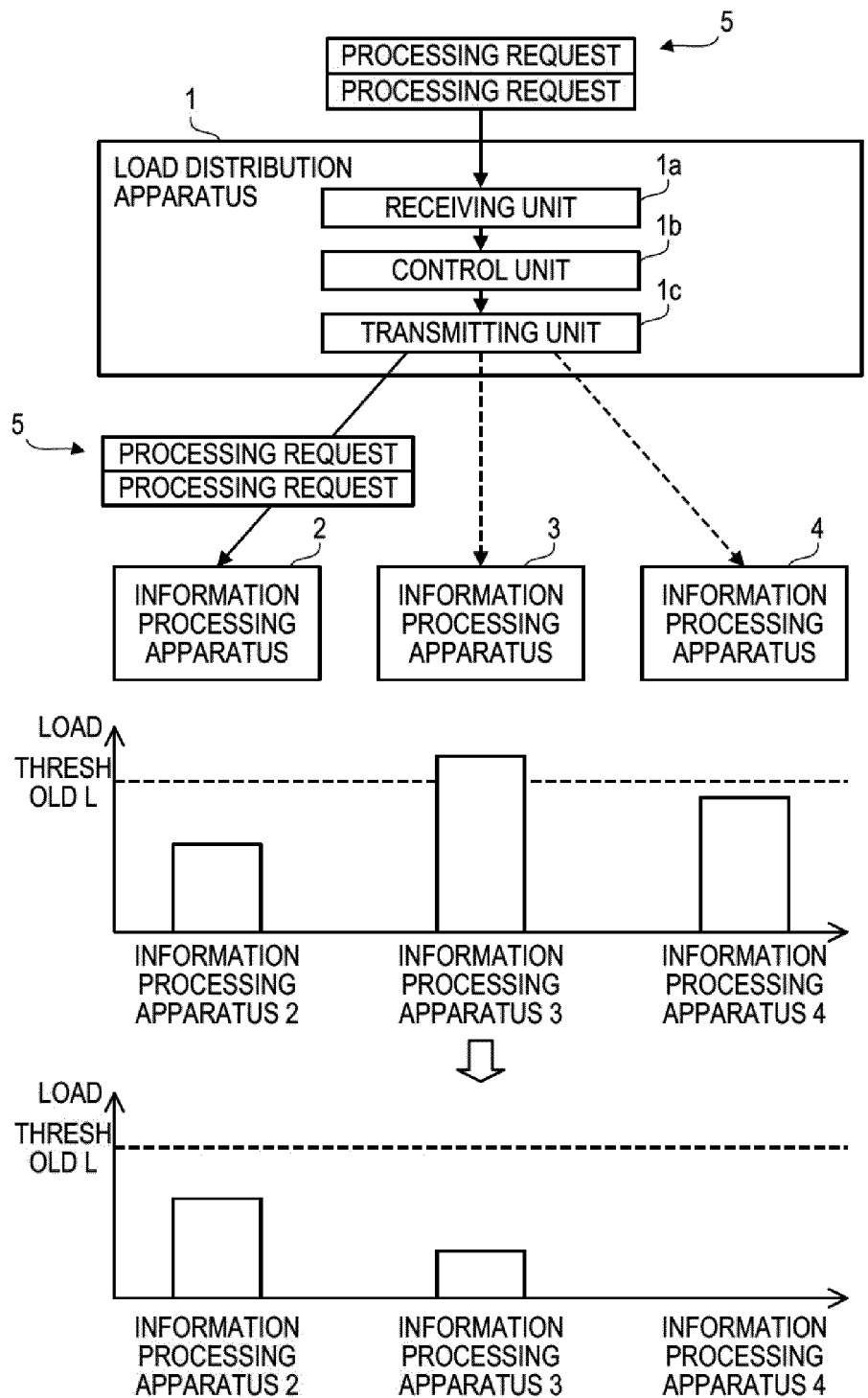
FIG. 1 illustrates a summary of a load distribution system.

FIG. 1 illustrates a summary of a load distribution system. The load distribution system includes a load distribution apparatus 1 and information processing apparatuses 2, 3, and 4. The load distribution apparatus 1 allocates processing requests 5 to the information processing apparatuses 2, 3, and 4. The information processing apparatuses 2, 3, and 4 execute processes according to the processing requests. The information processing apparatuses 2, 3, and 4 are, for example, servers that provide specific services.

The load distribution apparatus 1 includes a receiving unit 1a, a control unit 1b, and a transmitting unit 1c.

The receiving unit 1a receives the processing requests 5 for the information processing apparatuses 2, 3, and 4. The processing requests 5 are transmitted from, for example, clients that use the services provided by the information processing apparatuses 2, 3, and 4. The receiving unit 1a outputs the received processing requests 5 to the control unit 1b.

After acquiring the processing requests 5 from the receiving unit 1a, the control unit 1b selects an information processing apparatus, in which a specific load value is smaller than a predetermined threshold L, from the information processing apparatuses 2, 3, and 4. The load values may be acquired, for example, based on the number of processing requests allocated to the information processing apparatuses 2, 3, and 4 or the load of the hardware resources of the information processing apparatuses 2, 3, and 4. The control unit 1b, for example, periodically receives notifications of the load values from the information processing apparatuses 2, 3, and 4 and manages the load values. The threshold L is predetermined as a load value that does not impair the responsiveness of the information processing apparatuses 2, 3, and 4. The control unit 1b determines the information processing apparatus as the allocation destination until the load value of the information processing apparatus reaches the threshold L.

The transmitting unit 1c transmits the processing requests 5 to the allocation destination determined by the control unit 1b.

If there are a plurality of information processing apparatuses below the threshold L, the control unit 1b further determines an information processing apparatus as the allocation destination. In a first allocation destination determination method, for example, the information processing apparatus with the shortest elapsed time from the time when the transmission destination of the last processing request is set may be determined as the allocation destination. In a second allocation destination determination method, the information processing apparatus, in which the estimated time of the completion of all processes according to the allocated processing requests is the latest, may be set as the allocation destination.

When the first allocation destination determination method is used, it is assumed that the information processing apparatuses 2, 3, and 4 are in the following states when the load distribution apparatus 1 receives the processing requests 5. For example, it is assumed that the load values of the information processing apparatuses 2 and 4 are smaller than the threshold L, and the load value of the information processing apparatus 3 is greater than the threshold L. It is also assumed that the information processing apparatuses are arrayed in order of information processing apparatuses 3, 2, and 4 when arrayed in order from the latest transmission of the processing request. In this case, the control unit 1b determines the information processing apparatus 2, to which the processing request is most recently transmitted, of the information processing apparatuses 2 and 4 with load values smaller than the threshold L as the allocation destination of the processing requests 5.

When the second allocation destination determination method is used, it is assumed that the information processing apparatuses 2, 3, and 4 are in the following states when the load distribution apparatus 1 receives the processing requests 5. For example, it is assumed that the load values of the information processing apparatuses 2 and 4 are smaller than the threshold L and that the load value of the information processing apparatus 3 is greater than the threshold L. It is also assumed that the estimated time of the completion of all processes according to the allocated processing requests is later in the information processing apparatus 2 than in the information processing apparatus 4. In this case, the control unit 1b determines the information processing apparatus 2 as the allocation destination of the processing requests 5.

As a result, the processing requests are not transmitted to the information processing apparatuses 3 and 4 unless the load value of the information processing apparatus 2 is equal to or greater than the threshold L. Thus, the processing requests are concentrated on the information processing apparatus 2 when there are few processing requests for the load distribution system.

Therefore, the information processing apparatuses may be efficiently switched to the power saving state. For example, if a single information processing apparatus is able to ensure the responsiveness required in the load distribution system, the processing requests are allocated only to a specific information processing apparatus. For example, the processing requests are concentrated on the information processing apparatus 2, and the processing requests are not allocated to the information processing apparatuses 3 and 4. As a result, the processes that the information processing apparatuses 3 and 4 should execute are completed in the passage of time, and the load values of the information processing apparatuses 3 and 4 decrease. When this state continues, the load values of the information processing apparatuses 3 and 4 eventually become 0. The information processing apparatuses 3 and 4 may be switched to the power saving state. Thus, the information processing apparatuses may be switched to the power saving state without generating unnecessary load such as transferring the processes between the information processing apparatuses 2, 3, and 4.

To ensure the responsiveness of the load distribution system, it is preferable to allocate the processing requests to another information processing apparatus if the load value exceeds the threshold. For example, when only the information processing apparatus 2 is in the operation state, it is preferable to allocate the processing requests to the information processing apparatuses 3 and 4 depending on the amount of the processing requests because the responsiveness may be impaired when the processing requests increase. Another information processing apparatus may be put into the operation state before exceeding the threshold L. In this regard, a threshold (the value of which is smaller than the threshold L) for determining the activation of other information processing apparatuses may be further arranged, and an information processing apparatus in the power saving state may be changed to the operation state after exceeding the threshold.

The load distribution apparatus 1 may be applied to, for example, a Web system that provides Web services. An example of applying the load distribution apparatus 1 to the Web system will now be described further. Although the protocol for the load distribution is HTTP (Hyper Text Transfer Protocol) in the example, the arrangement is not limited to this. For example, the load distribution apparatus 1 may be applied to an information processing system that provides other services using protocols such as SMTP (Simple Mail Transfer Protocol) and FTP (File Transfer Protocol).

First Embodiment

A first embodiment will now be described in detail with reference to the drawings.

Figure 2:
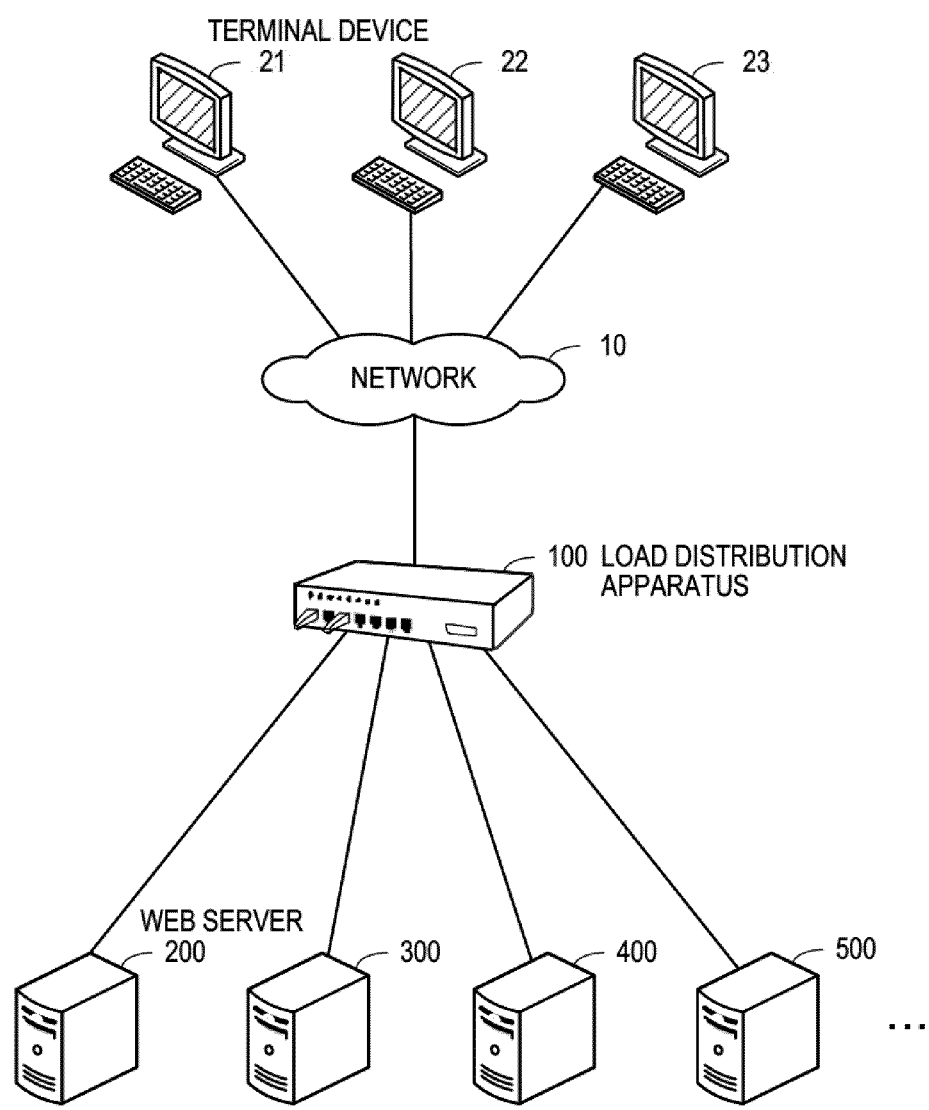
FIG. 2 illustrates a configuration of a Web system.

FIG. 2 illustrates a configuration of a Web system. The Web system includes a load distribution apparatus 100 and Web servers 200, 300, 400, 500, . . . . The load distribution apparatus 100 is connected to terminal devices 21, 22, and 23 through a network 10. The network 10 is a communication network such as the Internet or an intranet.

The load distribution apparatus 100 receives HTTP requests (hereinafter, simply "requests"), which are processing requests for the Web servers 200, 300, 400, 500, . . . , from the terminal devices 21, 22, and 23. The load distribution apparatus 100 determines an allocation destination of requests from among the Web servers 200, 300, 400, 500, . . . and transmits the requests to the determined Web server.

The load distribution apparatus 100 receives HTTP responses (hereinafter, simply "responses") for the transmitted requests from the Web servers 200, 300, 400, 500, . . . . The load distribution apparatus 100 then transmits the received responses to the terminal devices of the senders of the requests.

After receiving the requests from the load distribution apparatus 100, the Web servers 200, 300, 400, 500, . . . execute processes according to the requests and transmit the responses to the load distribution apparatus 100.

When the usage of the Web services is small, the load distribution apparatus 100 appropriately switches the Web servers operated in the Web system to the power saving state to save the power of the system. For example, the load is distributed by operating the Web servers according to the usage during the daytime with more usage of Web services, and only minimum Web servers are operated at night with less usage.

The power saving state is a mode for reducing the power consumption by controlling the power supply to the hardware devices. An example of the power saving state includes a mode in which the power is supplied to limited hardware devices such as a RAM (Random Access Memory), the stored data is held, and an OS (Operating System) may be quickly recovered to the original state based on the data. Another example includes a mode in which information of the RAM is written into a nonvolatile storage medium such as an HDD (Hard Disk Drive), the power supply to the RAM, etc., is terminated, and the information of the OS written into the HDD is loaded to the RAM upon the activation to recover the original state. The former mode and the latter mode are characterized in that the former consumes more power but the time required for the recovery is shorter. Such a mode is set in advance as a power saving state after the transition of the Web servers 200, 300, 400, 500, . . . . However, the power consumption effect may be improved by completely terminating the power supply to the Web servers 200, 300, 400, 500, . . . .

The load distribution apparatus 100 may efficiently put the Web servers 200, 300, 400, 500, . . . , into the power saving state. Hereinafter, such a configuration of the load distribution apparatus 100 will be described in detail.

Figure 3:
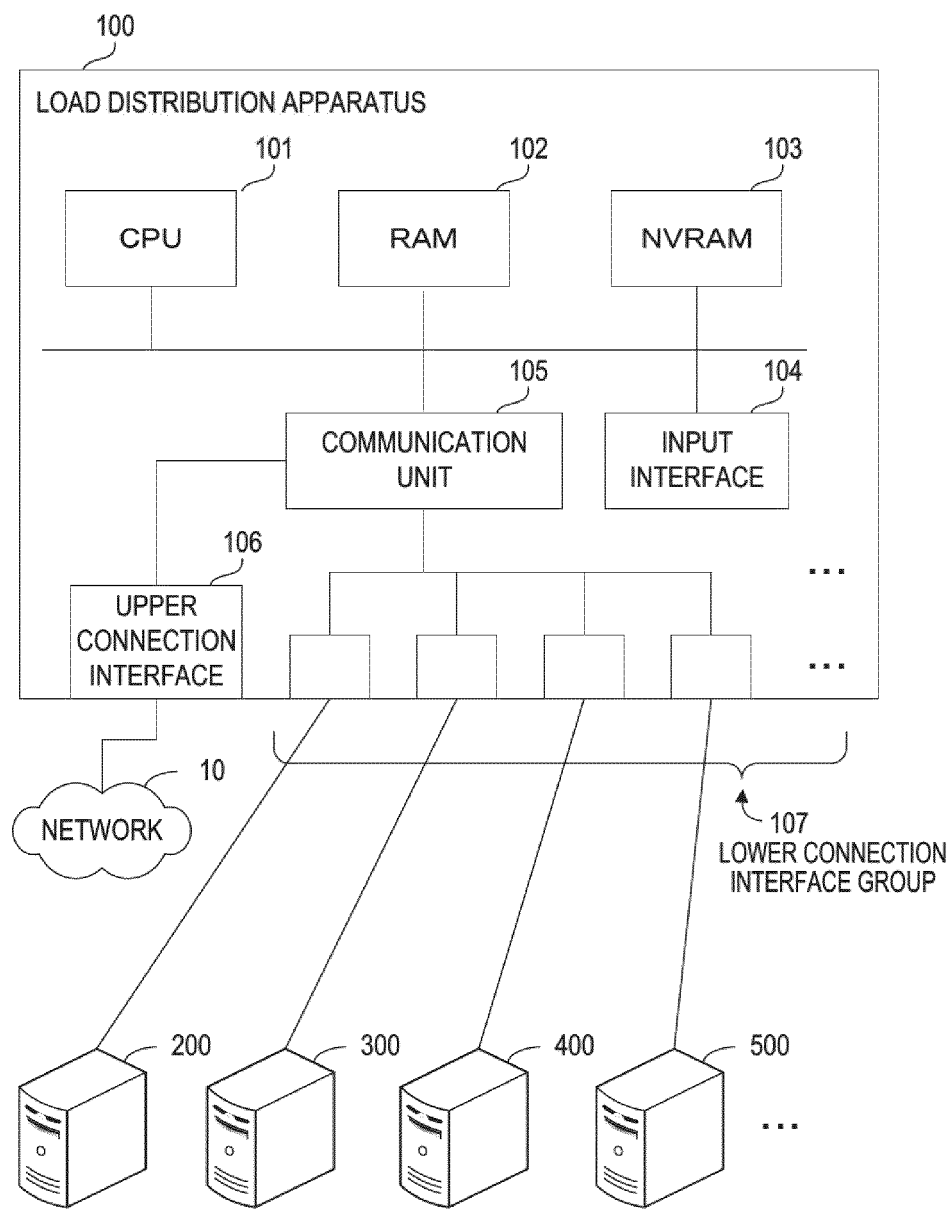
FIG. 3 illustrates a hardware configuration of a load distribution apparatus.

FIG. 3 illustrates a hardware configuration of a load distribution apparatus. The load distribution apparatus 100 includes a CPU (Central Processing Unit) 101, a RAM 102, an NVRAM (Non-Volatile RAM) 103, an input interface 104, a communication unit 105, an upper connection interface 106, and a lower connection interface group 107.

The CPU 101 controls the entire operation of the load distribution apparatus 100.

The RAM 102 temporarily stores at least part of the programs of an OS (Operating System) and programs of application software (hereinafter, "application") for the CPU 101 to execute. The RAM 102 also stores various data necessary for the processes by the CPU 101.

The NVRAM 103 stores the OS programs and the application programs. The NVRAM 103 also stores various data necessary for the processes by the CPU 101.

The input interface 104 receives input from external devices. The input interface is, for example, a serial communication port. The administrator of the system may connect an operational computer to the input interface 104 and use a protocol such as Telnet to perform various settings for the load distribution apparatus 100.

The communication unit 105 executes a data communication process. The upper connection interface 106 and the lower connection interface group 107 are connected to the communication unit 105. The upper connection interface 106 is a communication port for connecting with the network 10. The lower connection interface group 107 are communication ports for connecting with the Web servers 200, 300, 400, 500, . . . . The load distribution apparatus 100 and the Web servers 200, 300, 400, 500, . . . may be directly connected through the lower connection interface group 107, or a switching hub may be arranged between the load distribution apparatus 100 and the Web servers 200, 300, 400, 500, . . . .

Figure 4:
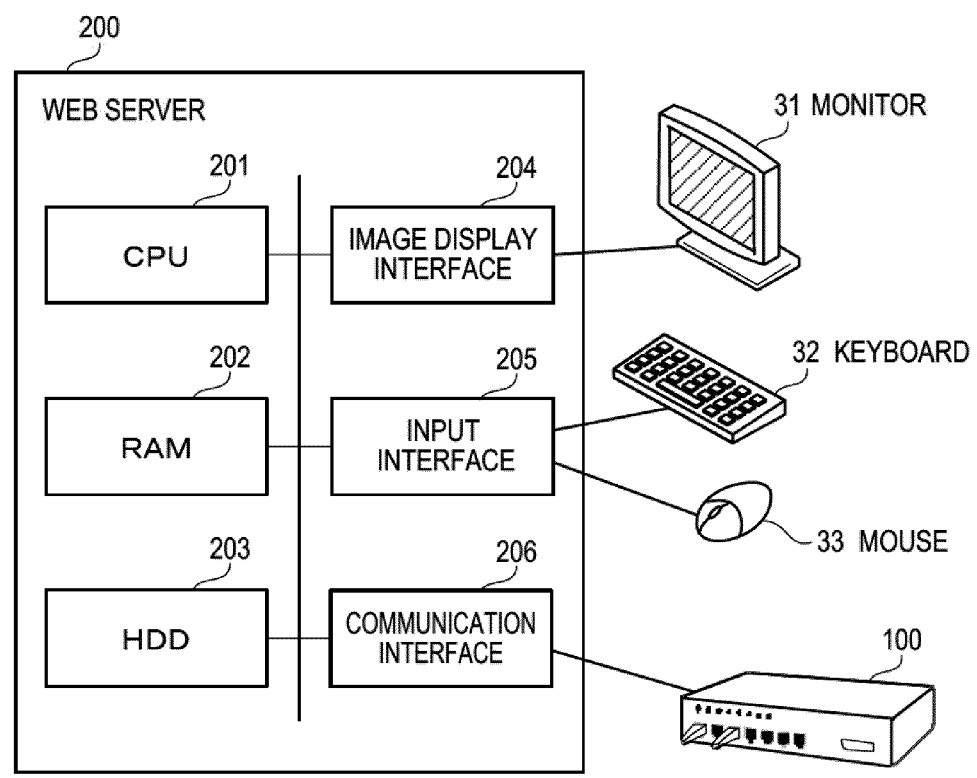
FIG. 4 illustrates a hardware configuration of a Web server.

FIG. 4 illustrates a hardware configuration of a Web server. The Web server 200 includes a CPU 201, a RAM 202, an HDD 203, an image display interface 204, an input interface 205, and a communication interface 206.

The CPU 201 controls the entire operation of the Web server 200.

The RAM 202 temporarily stores at least part of the OS programs and application programs for the CPU 201 to execute. The RAM 202 also stores various data required for the processes by the CPU 201.

The HDD 203 stores the OS programs and the application programs. The HDD 203 also stores various data necessary for the processes by the CPU 201.

The image display interface 204 is connected to a monitor 31. The image display interface 204 displays an image on the screen of the monitor 31 according to an instruction from the CPU 201.

The input interface 205 is connected to a keyboard 32 and a mouse 33. The input interface 205 transmits signals transmitted from the keyboard 32 and the mouse 33 to the CPU 201.

The communication interface 206 is connected to the load distribution apparatus 100 and transmits and receives data to and from the load distribution apparatus 100.

The Web servers 300, 400, 500, . . . may also be realized by hardware configurations similar to the Web server 200.

Figure 5:
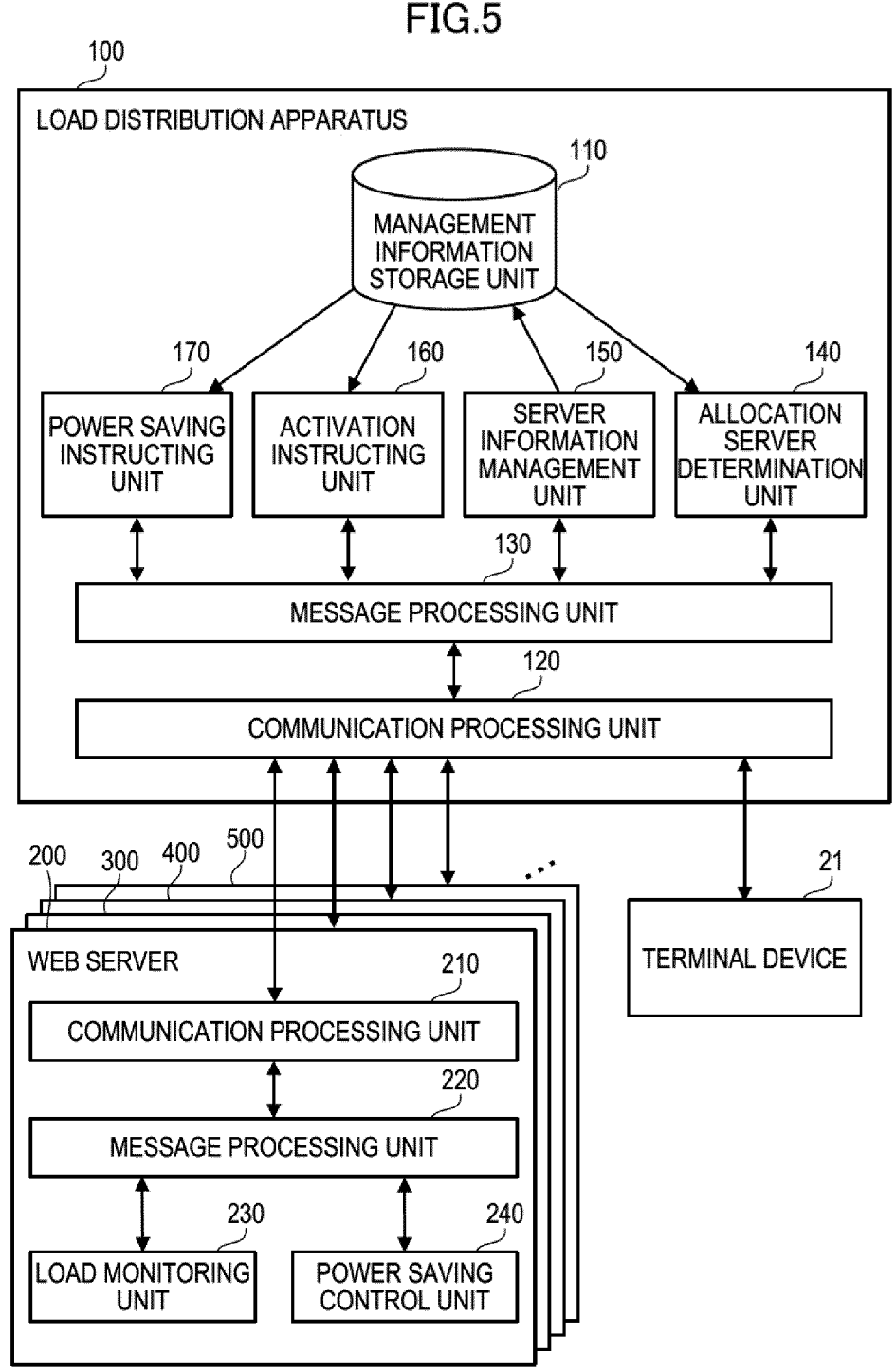
FIG. 5 illustrates a functional configuration of the load distribution apparatus and Web servers of a first embodiment.

FIG. 5 illustrates a functional configuration of a load distribution apparatus and Web servers of the first embodiment. The load distribution apparatus 100 includes a management information storage unit 110, a communication processing unit 120, a message processing unit 130, an allocation server determination unit 140, a server information management unit 150, an activation instructing unit 160, and a power saving instructing unit 170. The CPU 101 executes specific programs to realize these functions. However, part or all of the functions may be realized by dedicated hardware.

The management information storage unit 110 stores management information of the Web servers 200, 300, 400, 500, . . . . The management information includes server names, IP addresses, current operational status, load status, etc. The management information storage unit 110 also stores various threshold settings related to the load value used for determining the allocation destination of requests or terminating the servers. The administrator sets in advance values of the threshold settings without impairing the responsiveness of the Web system.

The communication processing unit 120 receives requests from the terminal device 21. The communication processing unit 120 transmits the received requests to one of the Web servers and receives responses corresponding to the requests from the Web server. The communication processing unit 120 further transmits the received responses to the terminal device 21.

The communication processing unit 120 also transmits various messages acquired from the message processing unit 130 to the Web servers 200, 300, 400, 500, . . . . The communication processing unit 120 outputs various messages received from the Web servers 200, 300, 400, 500, . . . to the message processing unit 130.

The message processing unit 130 generates and edits various messages. The message processing unit 130 instructs the components of the load distribution apparatus 100 to execute processes according to the received messages. For example, the following processes may be executed.

After the communication processing unit 120 receives requests from the terminal device 21, the message processing unit 130 causes the allocation server determination unit 140 to determine the allocation destination. The message processing unit 130 then edits the address of the requests to the determined allocation destination and outputs the requests to the communication processing unit 120. The message processing unit 130 also sends identification information (such as server name and IP address) of the Web server as the allocation destination to the server information management unit 150. When the communication processing unit 120 receives responses for the requests from the Web server, the message processing unit 130 edits the transmission destination of the responses to the address of the terminal device 21 and outputs the responses to the communication processing unit 120.

When the communication processing unit 120 receives information (load notification message) indicating the load status from the Web servers 200, 300, 400, 500, . . . , the message processing unit 130 outputs the information to the server information management unit 150.

After receiving an activation instruction of the Web server in the power saving state from the activation instruction unit 160, the message processing unit 130 generates a message corresponding to the instruction for the server and outputs the message to the communication processing unit 120. The message may be called an "activation instruction message." The message processing unit 130 outputs the identification information of the Web server to be activated to the server information management unit 150.

When the communication processing unit 120 receives a notification (all process completion message), which indicates the completion of all processes that the Web servers 200, 300, 400, 500, . . . are to execute, from the Web servers 200, 300, 400, 500, . . . , the message processing unit 130 outputs the notification to the power saving instruction unit 170. Accordingly, after a transition instruction of the server in the operation state to the power saving state is received from the power saving instructing unit 170, the message processing unit 130 generates a message for the server corresponding to the instruction and outputs the message to the communication processing unit 120. The message may be called a "power saving instruction message." The message processing unit 130 also outputs the identification information of the Web server to be switched to the server information management unit 150.

Based on the management information and the threshold information stored in the management information storage unit 110, the allocation server determination unit 140 determines the allocation destination of the requests received from the terminal device 21.

The server information management unit 150 updates the management information stored in the management information storage unit 110 according to the information acquired from the message processing unit 130. The updated information includes, for example, the load values of the Web servers, the operation state and/or power saving state, and the order of allocation of the processing requests.

When the server information management unit 150 updates the load value of the management information storage unit 110, the activation instructing unit 160 determines the necessity to activate the Web server in the power saving state based on the management information and the threshold information stored in the management information storage unit 110. When the activation is necessary, the activation instructing unit 160 sends the activation instruction and the identification information of the target Web server to the message processing unit 130.

After acquiring the all process completion notification of the Web servers 200, 300, 400, 500, . . . through the message processing unit 130, the power saving instructing unit 170 determines the possibility of transition of the Web servers 200, 300, 400, 500, . . . to the power saving state based on the management information and the threshold information stored in the management information storage unit 110. If the transition to the power saving state is possible, the power saving instructing unit 170 outputs an instruction for the Web servers 200, 300, 400, 500, . . . to transition to the power saving state to the message processing unit 130.

The Web server 200 includes a communication processing unit 210, a message processing unit 220, a load monitoring unit 230, and a power saving control unit 240. The CPU 201 executes specific programs to realize these functions. However, part or all of the functions may be realized by dedicated hardware.

The communication processing unit 210 receives the messages (including requests for the Web services) from the load distribution apparatus 100 and outputs the messages to the message processing unit 220. The communication processing unit 210 also transmits various messages acquired from the message processing unit 220 to the load distribution apparatus 100.

The message processing unit 220 generates various messages. The message processing unit 220 also instructs the components of the Web server 200 to execute processes according to the received messages. For example, the following processes may be executed.

When the communication processing unit 210 receives requests from the load distribution apparatus 100, the message processing unit 220 causes a service processing unit (not illustrated) corresponding to the requests to execute processes according to the requests. The message processing unit 220 also acquires responses generated by the service processing unit according to the requests and outputs the responses to the communication processing unit 210.

The message processing unit 220 periodically acquires load value information from the load monitoring unit 230, generates a message for sending the load value to the load distribution apparatus 100, and outputs the message to the communication processing unit 210. The message may be called a "load notification message."

When the communication processing unit 210 receives an activation instruction message from the load distribution apparatus 100, the message processing unit 220 instructs the power saving control unit 240 to switch from the power saving state to the operation state.

When the communication processing unit 210 receives a power saving instruction message from the load distribution apparatus 100, the message processing unit 220 instructs the power saving control unit 240 to switch from the operation state to the power saving state.

After receiving a notification that indicates that the load value is 0 from the load monitoring unit 230, the message processing unit 220 generates a message for indicating that the load value is 0 to the load distribution apparatus 100 and outputs the message to the communication processing unit 210. The message may be called an "all process completion message."

The load monitoring unit 230 periodically acquires the load value in the Web server 200. The load monitoring unit 230 may acquire the load value in the Web server 200 based on, for example, the number of incomplete requests and/or the load of the CPU 201. The load monitoring unit 230 outputs the acquired load value to the message processing unit 220. When the load value in the Web server 200 becomes 0, the load monitoring unit 230 notifies the message processing unit 220 that the load value in the Web server 200 is 0.

The power saving control unit 240 changes the operation state and the power saving state of the Web server 200. When the message processing unit 220 instructs switching to the power saving state, the power saving control unit 240 switches the Web server 200 from the operation state to the power saving state (power saving). When the message processing unit 220 instructs switching to the operation state, the power saving control unit 240 switches the Web server 200 from the power saving state to the operation state (activating).

The Web servers 300, 400, 500, . . . may also be realized by similar functional configurations.

Figure 6:
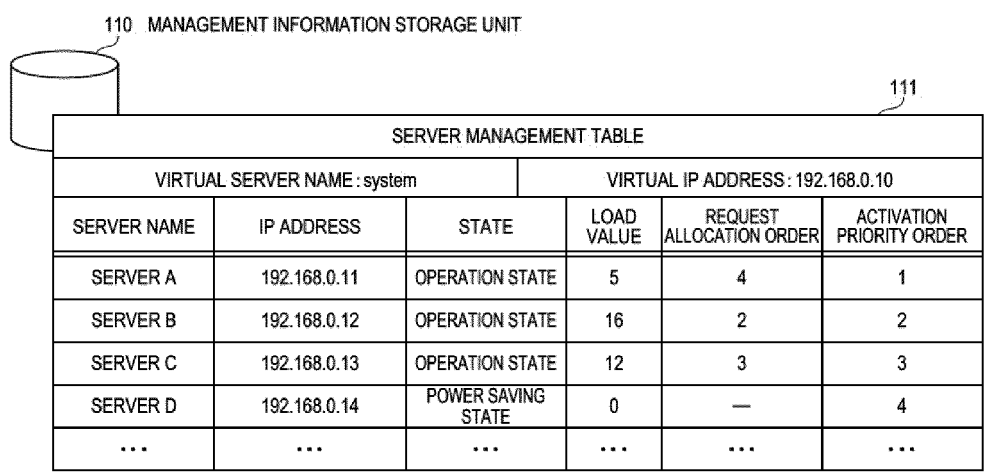
FIG. 6 illustrates a first data configuration example of a server management table of the first embodiment.

FIG. 6 illustrates a first configuration example of a server management table of the first embodiment. A server management table 111 is stored in the management information storage unit 110. The server management table 111 is arranged in the load distribution apparatus 100 for each virtual server that receives processing requests from the terminal devices 21, 22, and 23. The virtual server herein is a virtual server in the load distribution apparatus 100 for receiving the requests from the terminal devices 21, 22, and 23. It is assumed that the virtual server name associated with the services provided by the Web servers 200, 300, 400, 500, . . . is "System" and the virtual IP address is "192.168.0.10". Another server management table is arranged if there is another virtual server.

The server management table 111 includes a field indicating server names, a field indicating IP addresses, a field indicating states, a field indicating load values, a field indicating the request allocation order, and a field indicating the activation priority order. Pieces of information horizontally arrayed in the fields are associated with each other to indicate information related to one server.

The names of the servers are set in the field indicating server names. The IP addresses of the Web servers are set in the field indicating IP addresses. Information indicating the operation state or the power saving state is set in the field indicating states. The load values of the Web servers are set in the field indicating load values. Information indicating the order of allocation of requests is set in the field indicating the request allocation order. For example, numbers in ascending order may be used for the information indicating the order of allocation. In that case, the greater the number of the Web server is, the shorter is the elapsed time from the last request transmission. The priority order of activating the Web server is set in the field indicating the activation priority order. For example, the priority order may be set so that Web servers in operation that consume less power are prioritized.

For example, based on the setting of the Web server 200, the server management table 111 includes information of: server name "SERVER A", IP address "192.168.0.11", state "OPERATION STATE", load value "5", request allocation order "4", and activation priority order "1".

Similarly, information of "SERVER B" is set based on the setting of the Web server 300. Information of "SERVER C" is set based on the setting of the Web server 400. Information of "SERVER D" is set based on the setting of the Web server 500. The same applies to other servers.

The load value "5" related to "SERVER A" indicates there are five incomplete requests.

The request allocation order of the Web servers 200, 300, and 400 is "4", "2", and "3", respectively. This indicates that a request has been allocated to the Web server 200 most recently. The server allocated with the request before that is the Web server 400, and the server allocated with the earliest request is the Web server 300.

The activation priority order of the Web servers 200, 300, and 400 is "1", "2", and "3", respectively. The smaller the number of the priority order is, the earlier the Web server is switched from the power saving state to the operation state.

FIG. 7 illustrates a second data configuration example of a server management table of the first embodiment. A server management table 111a is stored in the management information storage unit 110. The server management table 111a is different from the server management table 111 in that the request allocation order is managed using the time the requests are last allocated to the Web servers.

The server management table 111a includes a field indicating server names, a field indicating IP addresses, a field indicating states, a field indicating load values, a field indicating final request allocation times, and a field indicating the activation priority order. Pieces of information horizontally arrayed in the fields are associated with each other to indicate information related to one server. Except the item indicating final request allocation times, the items include the same information as in the server management table 111.

The times that the requests are last allocated to the servers are set in the item indicating the final request allocation times.

For example, information that the final request allocation time is "10:00:00" is set for "SERVER A" in the server management table 111a. Information that the final request allocation time is "9:00:00" is set for "SERVER B". Information that the final request allocation time is "9:30:00" is set for "SERVER C". Therefore, the order of allocation of the requests is Web servers 200, 400, and 300, in order from the last allocation.

In this way, the time (final request allocation time) that the requests are last allocated to the Web servers may be managed as information corresponding to the item indicating the request allocation order.

Figure 8:
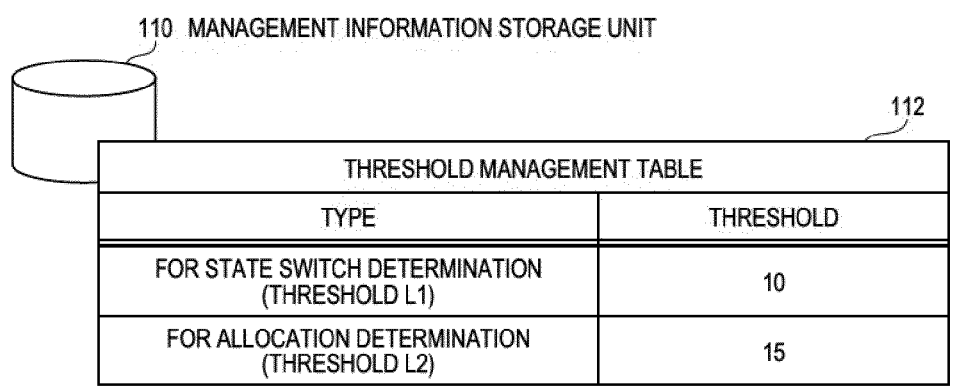
FIG. 8 illustrates a data configuration example of a load threshold management table.

FIG. 8 illustrates a data configuration example of a load threshold management table. A threshold management table 112 is stored in the management information storage unit 110. The threshold management table 112 includes an field indicating types and an field indicating thresholds. Pieces of information horizontally arrayed in the fields are associated with each other to indicate information related to one threshold.

Information indicating the types of applications of thresholds is set in the field indicating types. Load values as thresholds are set in the field indicating thresholds.

The threshold management table 112 includes, for example, information that the type is "FOR STATE SWITCH DETERMINATION" and the threshold is "10". This threshold will be referred to as a threshold L1. The threshold L1 is used to determine whether or not the Web servers 200, 300, 400, 500, . . . may be switched to the power saving state.

The threshold management table 112 also includes, for example, information that the type is "FOR ALLOCATION DETERMINATION" and the threshold is "15". This threshold will be referred to as threshold L2. The threshold L2 is used to determine to which of the Web servers 200, 300, 400, 500, . . . the requests may be allocated.

A smaller load value is set for the threshold L1 compared to the threshold L2. This is because the threshold L1 is a value used to determine whether to put another Web server into the operation state in advance so that the responses may not be delayed if the load value of a Web server, on which the processing requests are concentrated, is equal to or greater than the threshold L2.

A process of the load distribution apparatus 100 configured this way will now be described. A load distribution process and other processes using the server management table 111 will be described.

Figure 9:
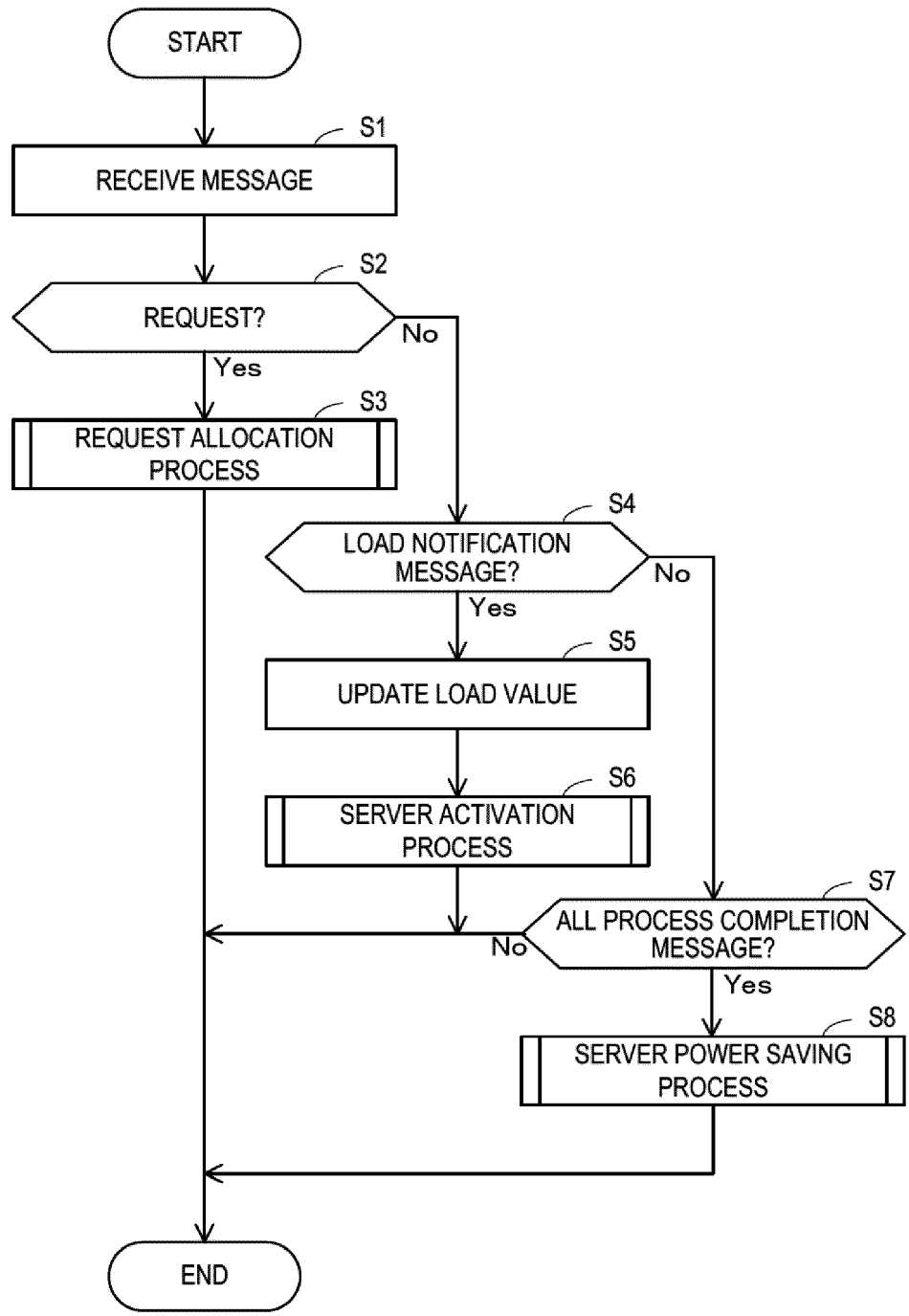
FIG. 9 is a flow chart of a message receiving process.

FIG. 9 is a flow chart of a message receiving process. The process illustrated in FIG. 9 will be described along with the step numbers.

[Step S1] The communication processing unit 120 receives messages (including requests for the virtual server from the terminal devices 21, 22, and 23). The communication processing unit 120 outputs the received messages to the message processing unit 130.

[Step S2] The message processing unit 130 determines whether the messages acquired from the communication processing unit 120 are requests for the Web services or not. If the messages are the requests, the process moves to step S3. If the messages are not the requests, the process moves to step S4. The message processing unit 130 may determine whether the requests are for the Web services by, for example, determining whether the received requests are for the virtual server.

[Step S3] The message processing unit 130 causes the allocation server determination unit 140 to determine the allocation destination of the requests. The message processing unit 130 sets the determined allocation destination as an address and outputs the requests to the communication processing unit 120. The communication processing unit 120 transmits the requests acquired from the message processing unit 130 to the Web server with the address.

[Step S4] The message processing unit 130 determines whether the messages acquired from the communication processing unit 120 are load notification messages from the Web servers 200, 300, 400, 500, . . . . If the messages are load notification messages, the process moves to step S5. If the messages are not load notification messages, the process moves to step S7.

[Step S5] The message processing unit 130 acquires the load values of the servers based on the load notification messages from the Web servers 200, 300, 400, 500, . . . . The message processing unit 130 then outputs the acquired load values to the server information management unit 150. The server information management unit 150 updates the server management table 111 stored in the management information storage unit 110 based on the load values of the servers acquired from the message processing unit 130.

[Step S6] When the server information management unit 150 updates the server management table 111 stored in the management information storage unit 110, the activation instructing unit 160 executes a server activation process.

[Step S7] The message processing unit 130 determines whether or not the messages acquired from the communication processing unit 120 are all process completion messages from the Web servers 200, 300, 400, 500, . . . . If the messages are all process completion messages, the process moves to step S8. If the messages are not all process completion messages, the process is completed.

[Step S8] The message processing unit 130 sends the identification information of the sending servers of the all process completion messages to the power saving instructing unit 170. Based on the identification information acquired from the message processing unit 130 and the server management table 111 and the threshold management table 112 stored in the management information storage unit 110, the power saving instructing unit 170 determines the possibility of the transition of the Web servers to the power saving state and sends the determination result to the message processing unit 130. If the determination result indicates that the transition is possible, the message processing unit 130 generates power saving instruction messages for the sending servers of the all process completion messages and outputs the power saving instruction messages to the communication processing unit 120. The communication processing unit 120 transmits the power saving instruction messages acquired from the message processing unit 130 to the Web servers.

In this way, the load distribution apparatus 100 executes a process according to the content of the received messages. When requests for the Web servers from the terminal devices 21, 22, 23 are received, the load distribution apparatus 100 executes a request allocation process. When load notification messages are received from the Web servers 200, 300, and 400, the load distribution apparatus 100 updates the load values of the server management table 111 and executes a server activation process. When all process completion messages are received from the Web servers 200, 300, 400, 500, . . . , the load distribution apparatus 100 executes a server power saving process.

The processes of steps S3, S6, and S8 will be described in further detail.

Figure 10:
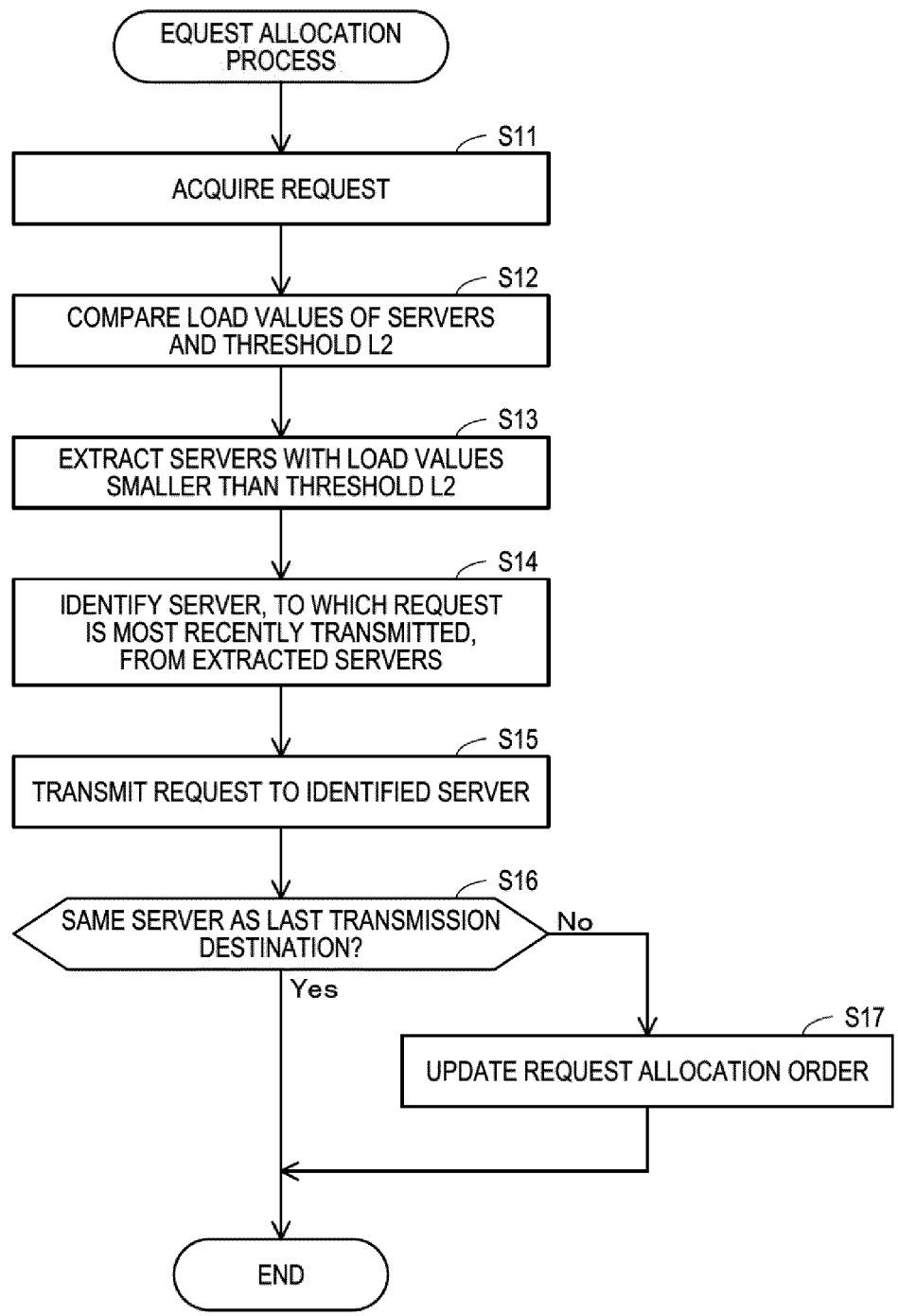
FIG. 10 is a flow chart of a request allocation process of the first embodiment.

FIG. 10 is a flow chart of a request allocation process of the first embodiment. The process illustrated in FIG. 10 will be described along with the step numbers. The following process content illustrates the process of step S3 of FIG. 9 in detail.

[Step S11] The allocation server determination unit 140 acquires requests for a virtual server "System" from the message processing unit 130.

[Step S12] The allocation server determination unit 140 identifies the server management table 111 corresponding to the virtual server name "System" stored in the management information storage unit 110. The allocation server determination unit 140 refers to the threshold L2 of the threshold management table 112 stored in the management information storage unit 110 and compares the load values of the servers of the server management table 111 with the threshold L2.

[Step S13] The allocation server determination unit 140 extracts servers with load values smaller than the threshold L2. In the example of FIGS. 6 and 7, the servers A and C are extracted.

[Step S14] The allocation server determination unit 140 refers to the request allocation order of the server management table 111 and identifies the server, to which the request is most recently transmitted, from the extracted servers. Thus, the server A is identified.

[Step S15] The allocation server determination unit 140 determines the identified server as the allocation destination of the requests and notifies the message processing unit 130. The message processing unit 130 outputs the requests, which have the allocation destination determined by the allocation server determination unit 140 as an address, to the communication processing unit 120. The communication processing unit 120 transmits the requests to the server with the address. Thus, the communication processing unit 120 transmits the requests to the server A (Web server 200).

[Step S16] The message processing unit 130 sends the identification information of the Web server as the destination to the server information management unit 150. The server information management unit 150 refers to the request transmission order of the server management table 111 stored in the management information storage unit 110 to determine whether the identified Web server is the same as the allocation destination of the last request. If the Web server is the same, the process is completed. If the Web server is different, the process moves to step S17.

[Step S17] The server information management unit 150 updates, in the server management table 111, the request allocation order of the Web server as the allocation destination of the present request. Therefore, "4" is set to the server A if up to "3" is set for other servers in the request allocation order.

In this way, after receiving requests for the Web services, the allocation server determination unit 140 compares the load values of the servers and the threshold L2 and extracts Web servers with load values smaller than the threshold L2. The allocation server determination unit 140 determines the Web server, among the Web servers with load values smaller than the threshold L2, with the shortest elapsed time from the time that the requests are transmitted to the allocation destination of the last request as the allocation destination of the present request.

When using the server management table 111a in step S14, the allocation server determination unit 140 identifies the server with the latest final request allocation time. Therefore, the server A is identified. In that case, in step S17, the server information management unit 150 updates the final request allocation time of the Web server as the allocation destination of the present request in the server management table 111a.

Figure 11:
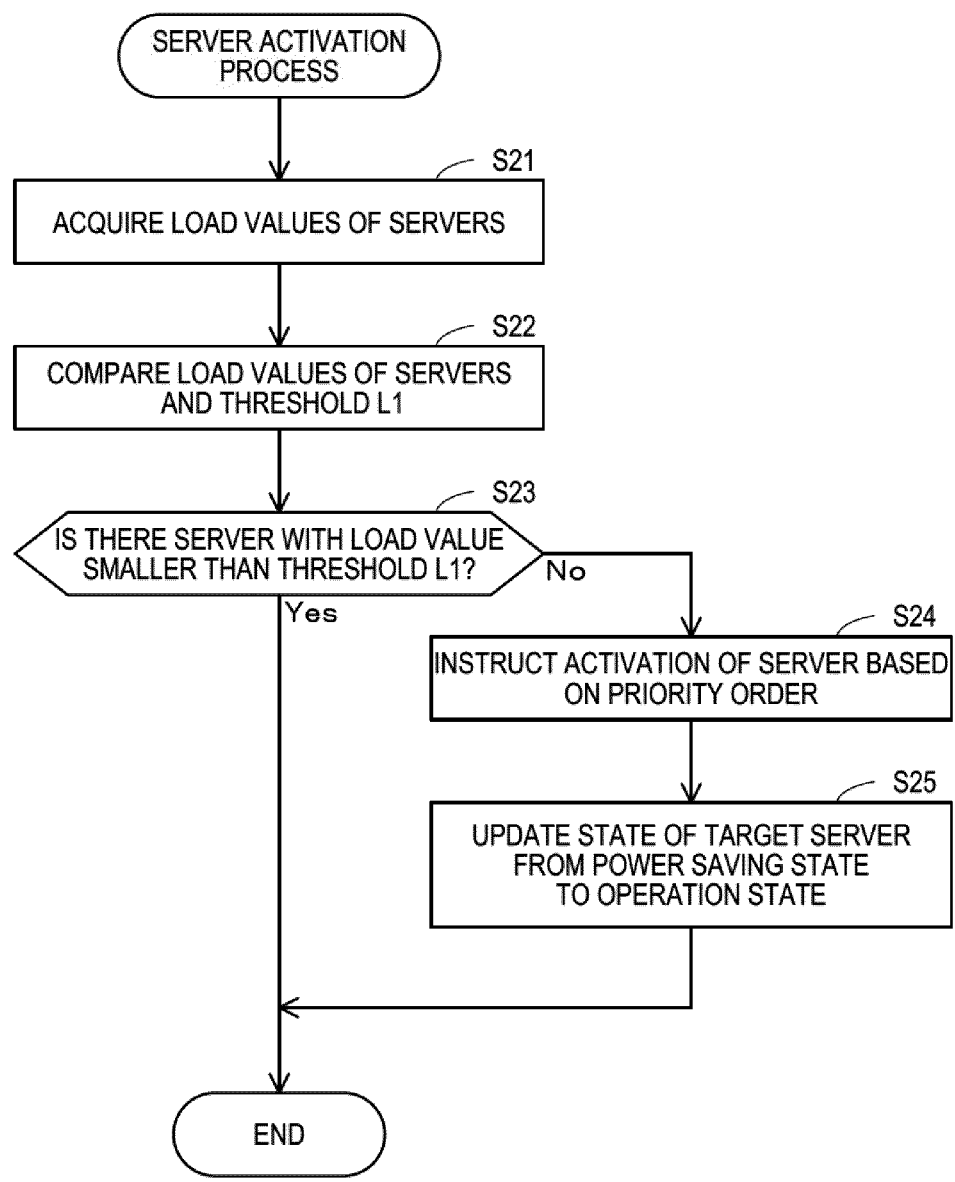
FIG. 11 is a flow chart of a server activation process.

FIG. 11 is a flow chart of a server activation process. The process illustrated in FIG. 11 will be described along with the step numbers. The following process illustrates the process of step S6 of FIG. 9 in detail.

[Step S21] The activation instructing unit 160 refers to the server management table 111 stored in the management information storage unit 110 and acquires the load values of the servers.

[Step S22] The activation instructing unit 160 refers to the threshold L1 of the threshold management table 112 stored in the management information storage unit 110 and compares the load values of the servers of the server management table 111 with the threshold L1.

[Step S23] The activation instructing unit 160 determines whether there is a Web server with the load value smaller than the threshold L1. If there is a Web server, the process is completed. If there is no Web server, the process moves to step S24.

[Step S24] The activation instructing unit 160 refers to the activation priority order of the server management table 111 and acquires the identification information of the Web server in the power saving state in which the activation is given a top priority. The activation instructing unit 160 instructs the message processing unit 130 to transmit an activation instruction to the identified Web server. The message processing unit 130 generates an activation instruction message to the identified Web server and outputs the message to the communication processing unit 120. The communication processing unit 120 transmits the activation instruction message acquired from the message processing unit 130 to the Web server.

[Step S25] The message processing unit 130 sends the identification information of the Web server as the destination of the activation instruction message to the server information management unit 150. The server information management unit 150 updates the state of the Web server corresponding to the sent identification information from the power saving state to the operation state in the server management table 111 stored in the management information storage unit 110.

In this way, if there is no Web server with the load value smaller than the threshold L1, the activation instructing unit 160 activates the Web server in the power saving state based on the activation priority order.

Figure 12:
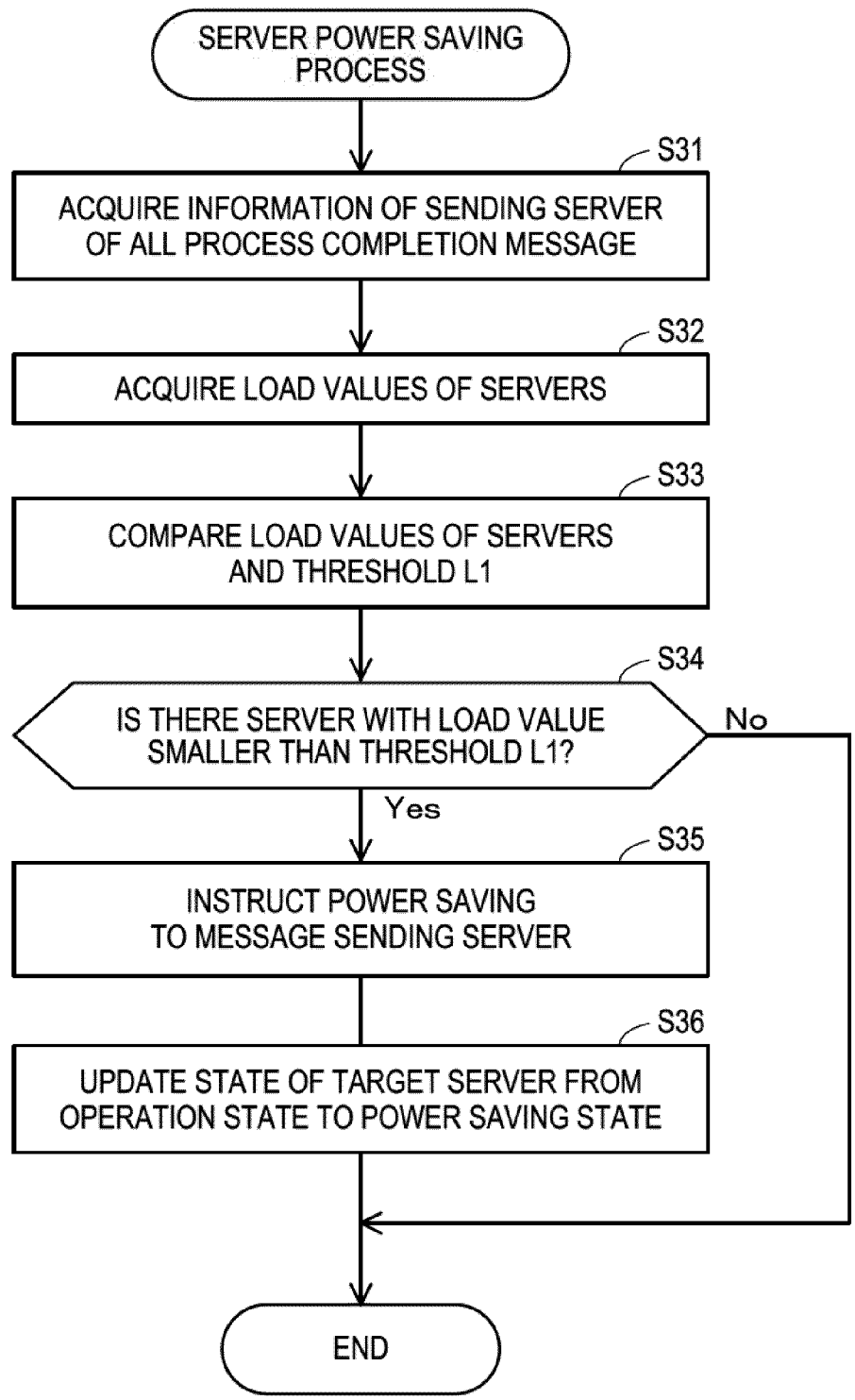
FIG. 12 is a flow chart of a server termination process.

FIG. 12 is a flow chart of a server termination process. The process illustrated in FIG. 12 will be described along with the step numbers. The following process illustrates the process of step S8 of FIG. 9 in detail.

[Step S31] The power saving instructing unit 170 acquires the identification information of the Web server of the sender of the all process completion message from the message processing unit 130.

[Step S32] The power saving instructing unit 170 refers to the server management table 111 stored in the management information storage unit 110 and acquires the load values of the servers.

[Step S33] The power saving instructing unit 170 refers to the threshold L1 of the threshold management table 112 stored in the management information storage unit 110 and compares the load values of the servers of the server management table 111 with the threshold L1.

[Step S34] The power saving instructing unit 170 determines whether there is a Web server, other than the Web servers whose identification information is acquired in step S31, with the load value smaller than the threshold L1. If there is a Web server, the process moves to step S35. If there is no Web server, the process is completed.

[Step S35] The power saving instructing unit 170 determines the Web server of the sender of the all process completion message is able to be switched to the power saving state and notifies the message processing unit 130. The message processing unit 130 generates a power saving instruction message for the Web server of the sender of the all process completion message and outputs the message to the communication processing unit 120. The communication processing unit 120 transmits the power saving instruction message acquired from the message processing unit 130 to the Web server.

[Step S36] The message processing unit 130 sends the identification information of the Web server as the destination of the power saving instruction message to the server information management unit 150. The server information management unit 150 updates the state of the Web server corresponding to the sent identification information from the operation state to the power saving state in the server management table 111 stored in the management information storage unit 110.

In this way, after receiving the all process completion messages from the Web servers, the power saving instructing unit 170 determines whether there is a Web server with a load value smaller than the threshold L1 other than the Web server of the message sender. If there is one or more Web server with a load value smaller than the threshold L1, the message processing unit 130 generates a power saving instruction message to the Web server of the sender of the all process completion message and transmits the message through the communication processing unit 120.

A flow of the process of the load distribution system will now be described.

FIG. 13 illustrates a first state example of a Web system. The first state example corresponds to the state illustrated in the server management table 111 of FIG. 6. However, other servers including the Web server 500 are not illustrated.

The load values of the Web servers 200, 300, and 400 are as follows in the example. The load value of the Web server 200 is smaller than the threshold L1. The load value of the Web server 300 is greater than the threshold L2. The load value of the Web server 400 is greater than the threshold L1 and smaller than the threshold L2. The allocation destination of the requests by the load distribution apparatus 100 is the Web server 200.

When the requests for the Web system decrease in this condition, the load distribution apparatus 100 may efficiently put the Web servers 300 and 400 into the power saving state while maintaining the Web server 200.

Figure 14:
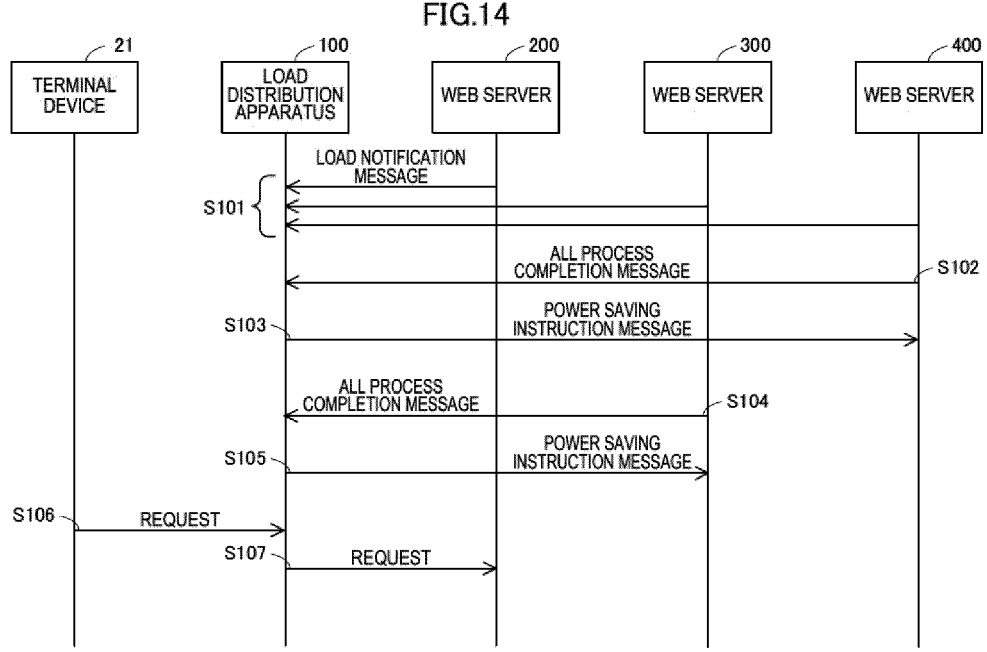
FIG. 14 is a flow of a server termination.

FIG. 14 is a flow of server termination. The process illustrated in FIG. 14 will be described along with the step numbers. The following content illustrates the process executed from the condition illustrated in FIG. 13.

[Step S101] The load distribution apparatus 100 receives load notification messages from the Web servers 200, 300, and 400. Based on the received load notification messages, the load distribution apparatus 100 updates the load values of the server management table 111 stored in the management information storage unit 110. Subsequently, the amount of requests received by the load distribution apparatus 100 decreases, and there is no more increase in the load value of the Web server 200. The load values of the Web servers 300 and 400 gradually decrease.

[Step S102] The load distribution apparatus 100 receives an all completion message from the Web server 400.

[Step S103] Other than the Web server 400, the load distribution apparatus 100 determines that the load value of the Web server 200 is smaller than the threshold L1. The load distribution apparatus 100 then transmits a power saving instruction message to the Web server 400. After receiving the power saving instruction message, the Web server 400 switches from the operation state to the power saving state.

[Step S104] The load distribution apparatus 100 receives an all process completion message from the Web server 300.

[Step S105] Other than the Web server 300, the load distribution apparatus 100 determines that the load value of the Web server 200 is smaller than the threshold L1. The load distribution apparatus 100 transmits a power saving instruction message to the Web server 300. After receiving the power saving instruction message, the Web server 300 switches from the operation state to the power saving state.

[Step S106] The load distribution apparatus 100 receives a request from the terminal device 21.

[Step S107] The load distribution apparatus 100 transmits the received request to the Web server 200. Only the Web server 200 is in the operation state and the Web servers 300 and 400 maintain the power saving state in the Web system unless the amount of requests increases and the load value of the Web server 200 is equal to or greater than the threshold L1.

Figure 15:
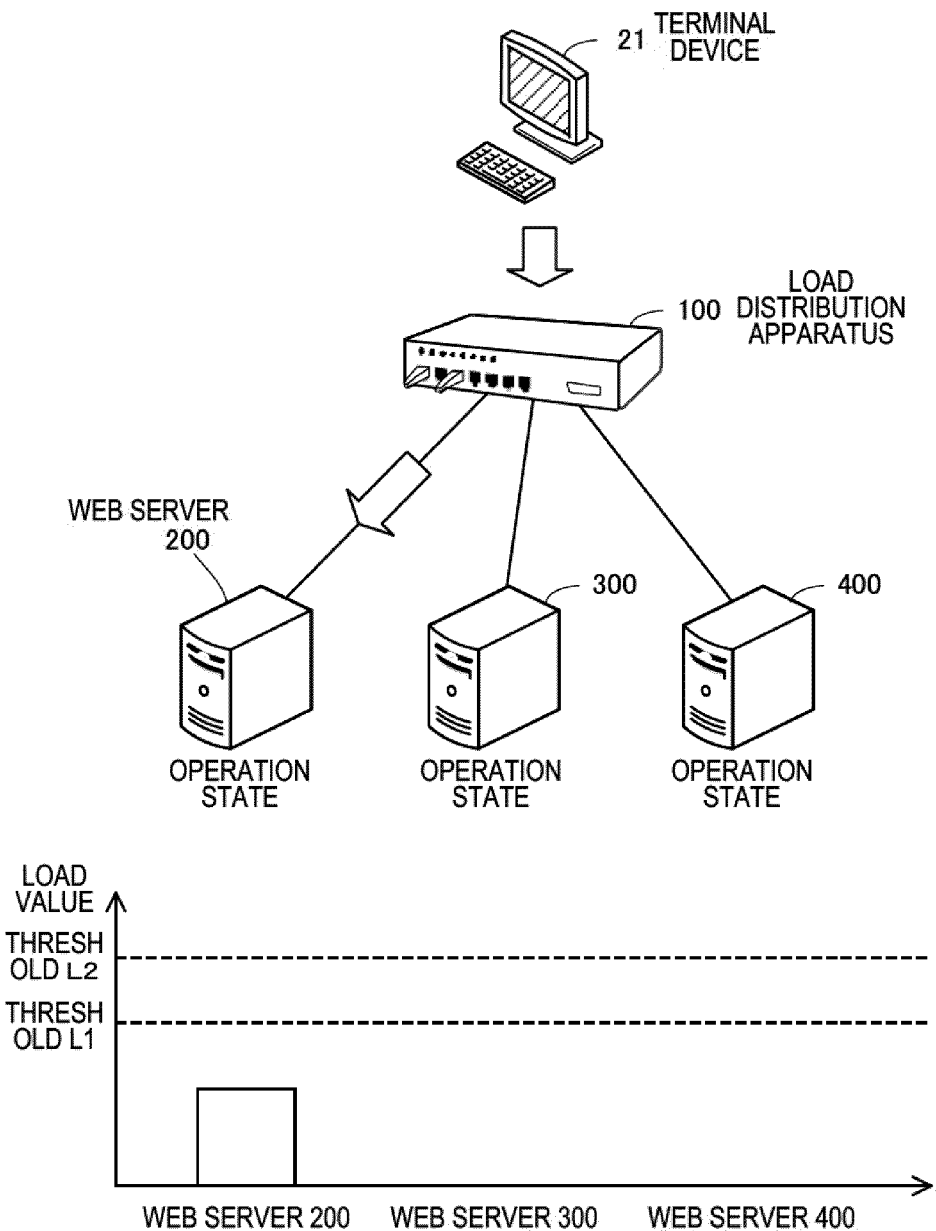
FIG. 15 illustrates a second state example of the Web system.

FIG. 15 illustrates a second state example of a Web system. The second state example illustrates the state of the Web system after step S107 of FIG. 14.

In this way, when the usage of system is small, only the minimum amount of servers may be put into the operation state without impairing the response performance, and other servers may be put into the power saving state. As a result of the transition to the power saving state, the processes of the servers do not have to be transferred. Therefore, the responsiveness of the Web system is not impaired due to the processing load.

A case that the amount of requests for the Web system increases from this state will now be described.

Figure 16:
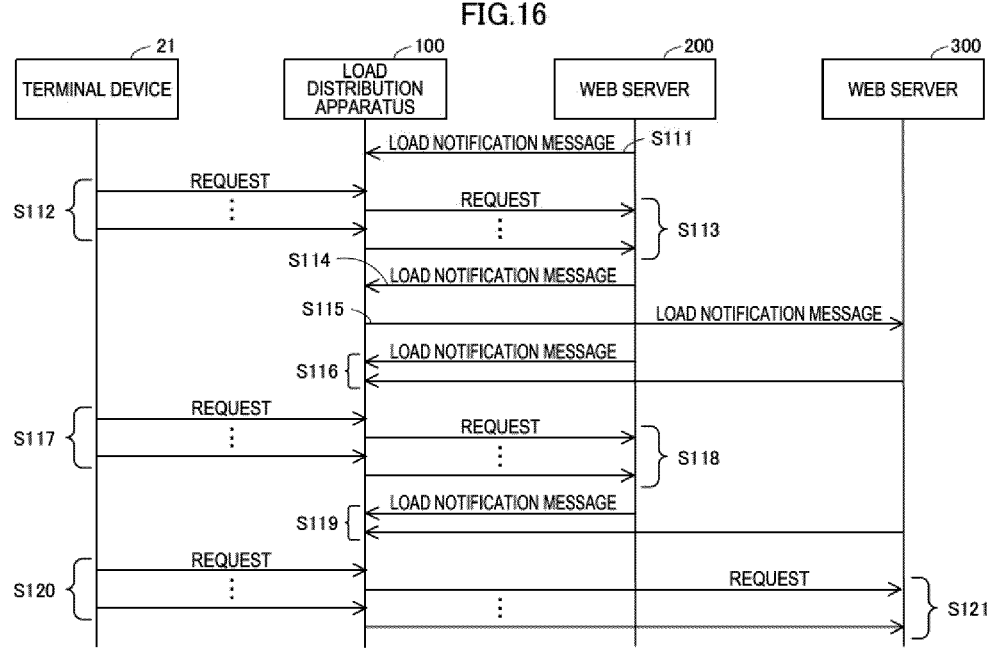
FIG. 16 is a flow of a server activation.

FIG. 16 is a flow of server activation. The process illustrated in FIG. 16 will be described along with the step numbers. The following content illustrates a process executed from the condition illustrated in FIG. 15.

[Step S111] The load distribution apparatus 100 receives a load notification message from the Web server 200. Based on the received load notification message, the load distribution apparatus 100 updates the load value of the server A of the server management table 111 stored in the management information storage unit 110. At this point, it is assumed that the load value of the server A is smaller than the threshold L1.

[Step S112] The load distribution apparatus 100 receives a request group from the terminal device 21.

[Step S113] The load distribution apparatus 100 transmits the received request group to the Web server 200.

[Step S114] The load distribution apparatus 100 receives a load notification message from the Web server 200. Based on the received load notification message, the load distribution apparatus 100 updates the load value of the server A of the server management table 111 stored in the management information storage unit 110. At this point, it is assumed that the load value of the server A is equal to or greater than the threshold L1.

[Step S115] The load distribution apparatus 100 refers to the server management table 111 stored in the management information storage unit 110 and transmits an activation instruction message to the Web server 300 whose activation priority order is the highest among the Web servers in the power saving state. After receiving the activation instruction message, the Web server 300 switches from the power saving state to the operation state.

[Step S116] The load distribution apparatus 100 receives load notification messages from the Web servers 200 and 300. Based on the received load notification messages, the load distribution apparatus 100 updates the load values of the servers A and B of the server management table 111 stored in the management information storage unit 110. At this point, it is assumed that the load value of the server A is equal to or greater than the threshold L1 and smaller than the threshold L2. The load value of the server B is 0 as all requests are concentrated on the server A at this point.

[Step S117] The load distribution apparatus 100 receives a request group from the terminal device 21.

[Step S118] The load distribution apparatus 100 transmits the received request group to the Web server 200.

[Step S119] The load distribution apparatus 100 receives a load notification message from the Web server 200. Based on the received load notification message, the load distribution apparatus 100 updates the load values of the servers A and B of the server management table 111 stored in the management information storage unit 110. At this point, it is assumed that the load value of the server A is equal to or greater than the threshold L2. The load value of the server B is 0 as all requests are concentrated on the server A at this point.

[Step S120] The load distribution apparatus 100 receives a request group from the terminal device 21.

[Step S121] The load distribution apparatus 100 transmits the received request group to the Web server 300.

Figure 17:
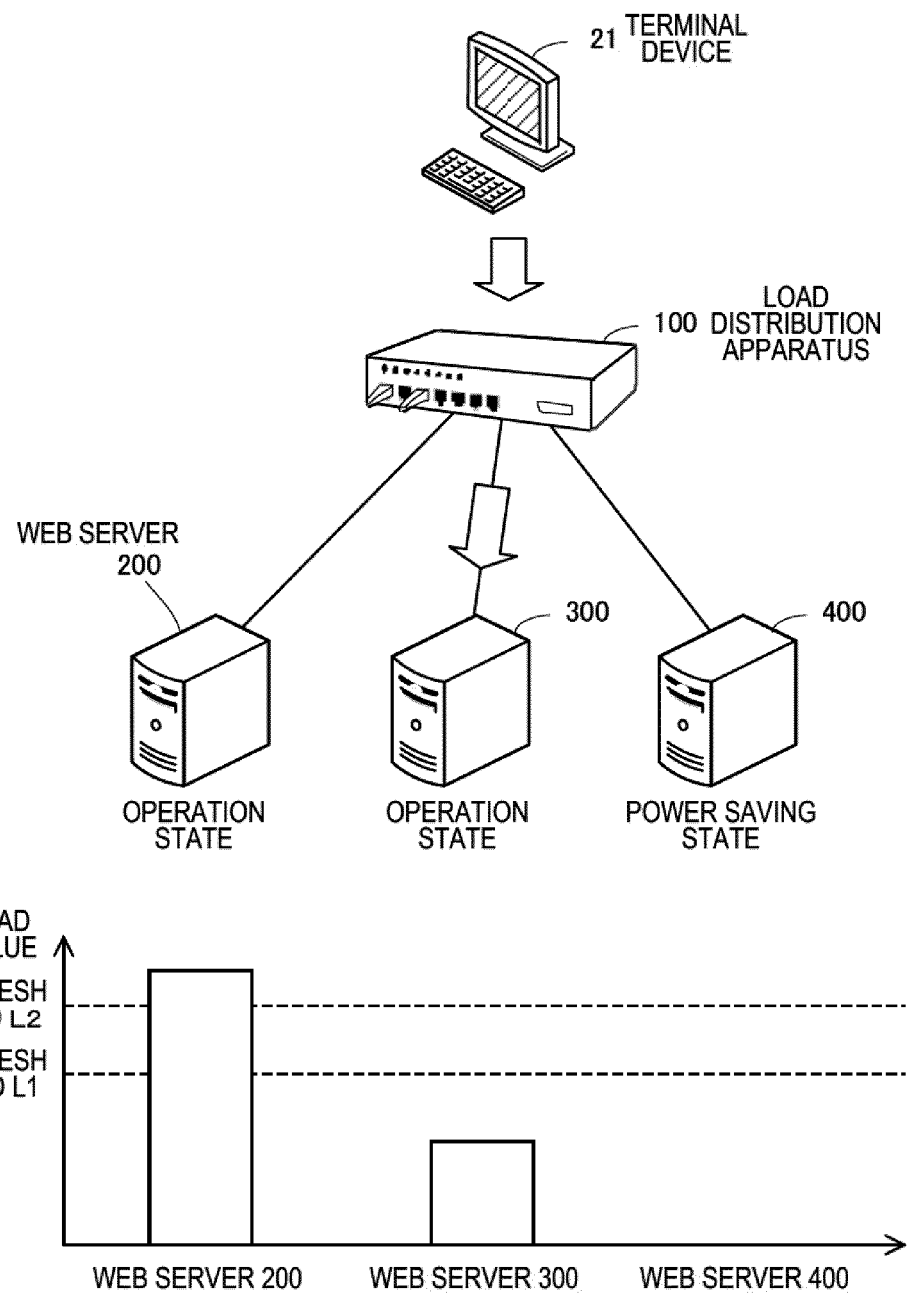
FIG. 17 illustrates a third state example of the Web system.

FIG. 17 illustrates a third state example of a Web system. The third state example illustrates the state of the Web system immediately after step S121 of FIG. 16. The load value of the Web server 200 is equal to or greater than the threshold L2, and the load value of the Web server 300 is smaller than the threshold L1. Therefore, the load distribution apparatus 100 concentrates the requests from the terminal device 21 on the Web server 300.

In this way, if the load value of the Web server 200 exceeds the threshold L1, the Web server 300 is switched to the operation state in advance. Therefore, the requests may be smoothly allocated to the Web server 300 even if the requests to the Web system increase and the load value of the Web server 200 exceeds the threshold L2, and the responsiveness of the Web system is not impaired.

After more time has passed from this state, the Web system may enter the following two states depending on the load values of the Web servers 200 and 300.

Figure 18A:
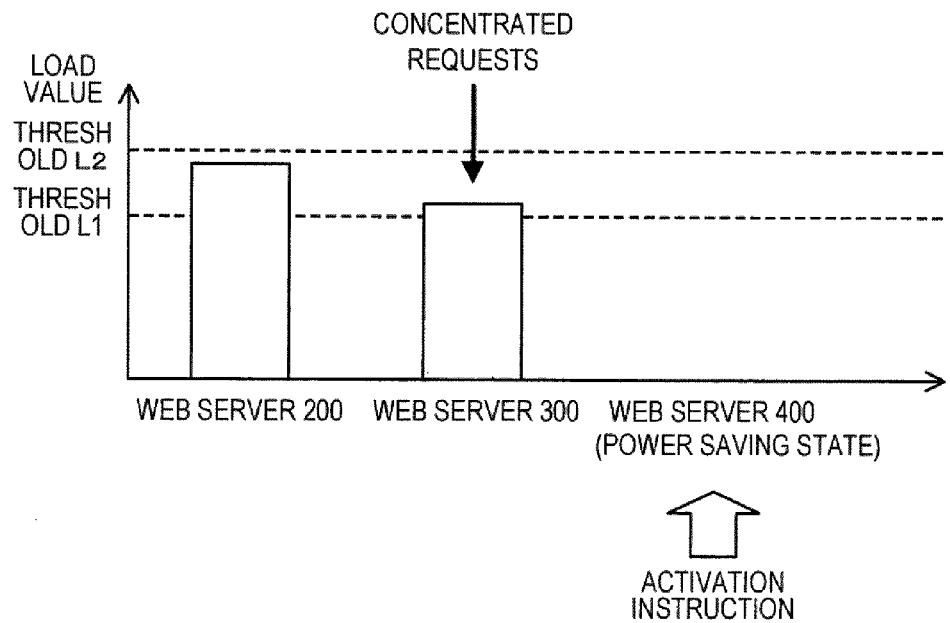
FIGS. 18A and 18B illustrate fourth state examples of the Web system.
Figure 18B:
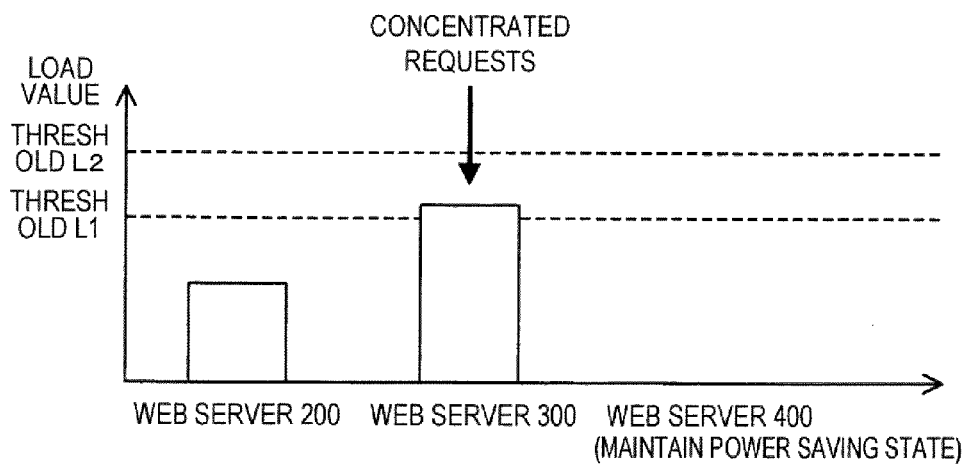

FIG. 18 illustrates a fourth state example of a Web system. FIG. 18A illustrates a case that the Web server 400 is further switched to the operation state, and FIG. 18B illustrates a case that the Web server 400 stays in the power saving state.

FIG. 18A illustrates a case where the load value of the Web server 300, on which the requests are concentrated, is equal to or greater than the threshold L1 and the load value of the Web server 200 is equal to or greater than the threshold L1. In this case, the load distribution apparatus 100 transmits an activation instruction message to the Web server 400 to switch the Web server 400 from the power saving state to the operation state.

FIG. 18B illustrates a case where the load value of the Web server 300, on which the requests are concentrated, is equal to or greater than the threshold L1 and the load value of the Web server 200 is smaller than the threshold L1. In this case, the load distribution apparatus 100 maintains the power saving state of the Web server 400. If the amount of requests increases and the load value of the Web server 300 is equal to or greater than the threshold L2, the load distribution apparatus 100 concentrates the requests on the Web server 200.

In this way, the load distribution apparatus 100 may efficiently change the operation state and the power saving state of the Web servers 200, 300, 400, 500, . . . according to the usage of the Web system. As a result, the power may be saved without impairing the responsiveness of the Web system.

As described, the load distribution apparatus 100 selects a Web server with the load value smaller than the threshold L2 and determines the Web server as the allocation destination of the requests until the load value of the selected Web server reaches the threshold L2. This reduces the load of other Web servers. Therefore, the load of the servers other than the Web server on which the requests are concentrated eventually becomes 0 if the usage of the system is small, and the servers may be switched to the power saving state without involving the transfer, etc., of the processes.

The load distribution apparatus 100 determines the server, to which the request is most recently allocated, among the servers with load values smaller than the threshold L2, as the request allocation destination. As a result, servers, to which the requests are allocated in the past, are not likely to be the allocation targets of the requests, and the load of the servers may be efficiently reduced.

Therefore, the load distribution apparatus 100 manages the order of allocation of the requests to the Web servers and the final allocation times of the requests. As a result, the load distribution apparatus 100 may efficiently identify the server on which the requests may be concentrated.

Second Embodiment

A second embodiment will now be described in detail with reference to the drawings. Differences from the first embodiment will be mainly described, and the description of similar items will be omitted.

The second embodiment is different from the first embodiment in that the load distribution apparatus determines the allocation destination of the requests based on the times required for the processes that the servers may execute according to the allocated requests. In the first embodiment, the allocation destination is determined based on the number of incomplete requests in the servers or the order of allocation of processes. Meanwhile, in the second embodiment, the loads of the servers are appropriately figured out even if the processing times of the requests are different.

A load distribution system according to the second embodiment may be realized by a system configuration equivalent to the load distribution system according to the first embodiment illustrated in FIG. 2. The load distribution apparatus and Web servers according to the second embodiment may be realized by hardware configurations equivalent to the load distribution apparatus 100 and the Web server 200 according to the first embodiment illustrated in FIGS. 3 and 4.

Figure 19:
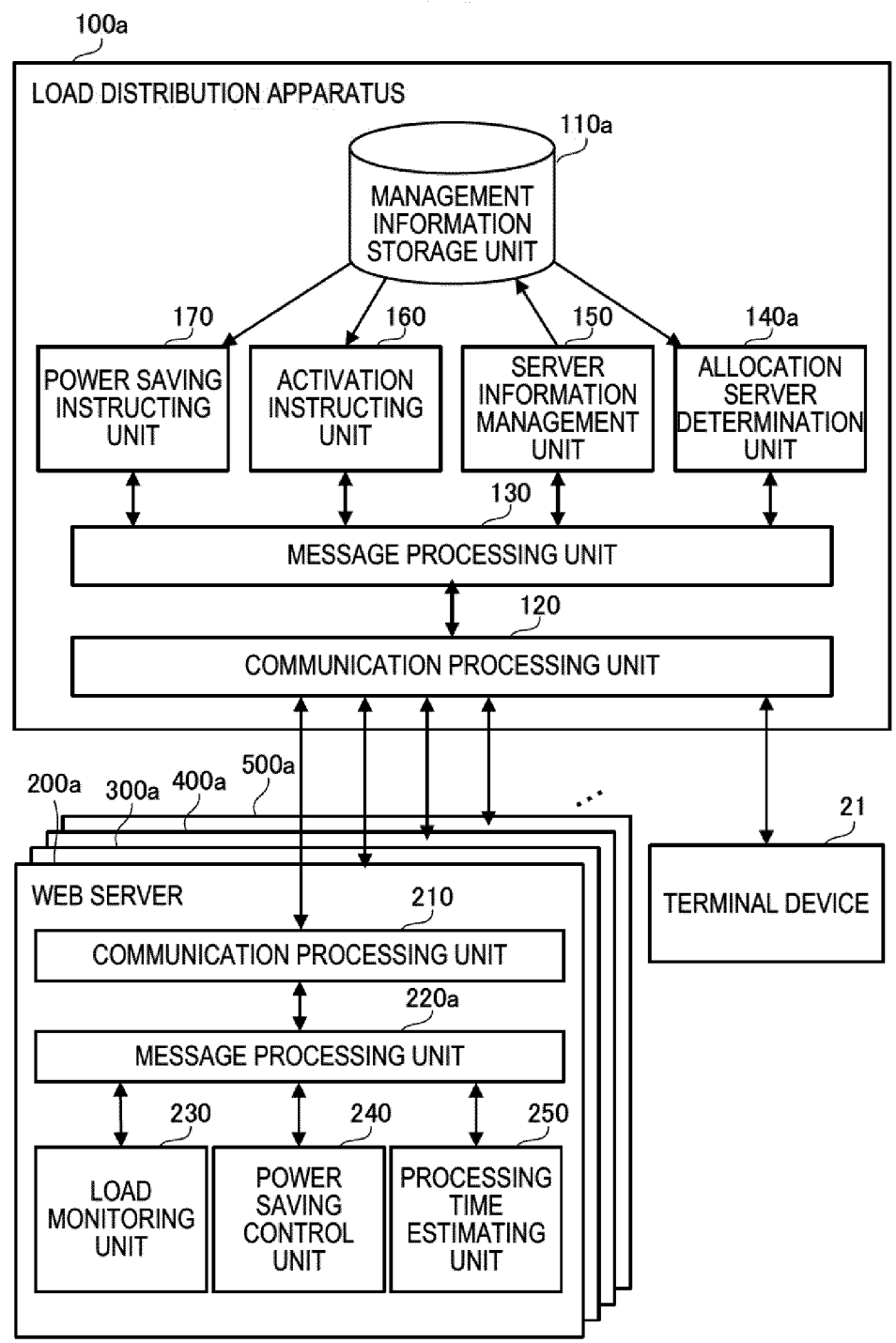
FIG. 19 illustrates a functional configuration of a load distribution apparatus and Web servers of a second embodiment.

FIG. 19 illustrates a functional configuration of a load distribution apparatus and Web servers of the second embodiment. A load distribution apparatus 100a includes a management information storage unit 110a, the communication processing unit 120, the message processing unit 130, an allocation server determination unit 140a, the server information management unit 150, the activation instructing unit 160, and the power saving instructing unit 170. The communication processing unit 120, the message processing unit 130, the server information management unit 150, the activation instructing unit 160, and the power saving instructing unit 170 have the same configurations as described by the same reference numerals in the load distribution apparatus 100 of FIG. 5.

The management information storage unit 110a corresponds to the management information storage unit 110 of FIG. 5. However, management information stored by the management information storage unit 110a is based on processing times of requests allocated to Web servers 200a, 300a, 400a, 500a, . . . . The specific content will be described in FIG. 20.

The allocation server determination unit 140a corresponds to the allocation server determination unit 140 of FIG. 5. The allocation server determination unit 140a determines the allocation destination of the requests received from the terminal device 21 based on management information and threshold information stored in the management information storage unit 110a.

The Web server 200a includes the communication processing unit 210, a message processing unit 220a, the load monitoring unit 230, the power saving control unit 240, and a processing time estimating unit 250. The communication processing unit 210, the load monitoring unit 230, and the power saving control unit 240 have the same configurations as described by the same reference numerals in the Web server 200 of FIG. 5.

The message processing unit 220a corresponds to the message processing unit 220 of FIG. 5. In addition to the function of the message processing unit 220, the message processing unit 220a generates a message for indicating an all process completion estimated time based on information acquired from the processing time estimating unit 250. The message may be called a "completion estimated time message." The message processing unit 220a transmits the generated completion estimated time message to the load distribution apparatus 100a through the communication processing unit 210.

The processing time estimating unit 250 estimates the processing time of the allocated requests. The processing time estimating unit 250 averages the times required for processing the requests with the same processing content to calculate the processing times of the requests. The processing time estimating unit 250 manages the processing time by updating the processing time of the request every time the process of the request is completed. When the communication processing unit 210 receives a new request, the processing time estimating unit 250 outputs information of an estimated time (all process completion estimated time) of the completion of all processes of incomplete requests including the request to the message processing unit 220a.

If the Web server 200a is the allocation target of the requests at this point, it is preferable that the processing time estimating unit 250 does not execute the estimation process of the processing time to avoid generating unnecessary load. Therefore, the processing time estimating unit 250 detects, for example, that the requests are not newly allocated for a specific time. Thus, the processing time estimating unit 250 may start the estimation process of the processing time when the allocation target of requests changes to another Web server. In this way, the processing time may be appropriately calculated in a stable condition, and unnecessary load due to the calculation of the processing time is not generated when the load is high, such as when requests are received.

The Web servers 300a, 400a, 500a, . . . may also be realized by similar functional configurations as the Web server 200a.

Figure 20:
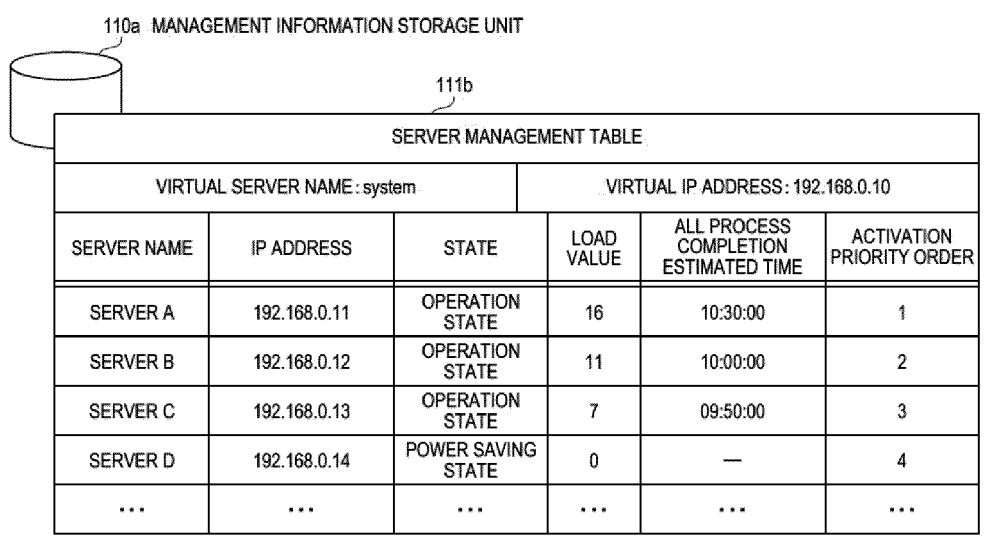
FIG. 20 illustrates a data configuration example of a server management table of the second embodiment.

FIG. 20 illustrates a data configuration example of a server management table of the second embodiment. A server management table 111b is stored in the management information storage unit 110a. The server management table 111b includes a field indicating server names, a field indicating IP addresses, a field indicating states, a field indicating load values, a field indicating all process completion estimated times, and a field indicating the activation priority order. Pieces of information horizontally arrayed in the fields are associated with each other to indicate information related to one server.

The field indicating server names, the field indicating IP addresses, the field indicating states, the field indicating the load values, and the field indicating the activation priority order include the same information as the fields with the same names in the server management table 111 of FIG. 6. Estimated times of the completion of all processes of requests allocated to the servers are set in the field indicating all process completion estimated times.

For example, information that the all process completion estimated time is "10:30:00" is set for "SERVER A" in the server management table 111b.

A process of the load distribution apparatus 100a configured as described above will now be described.

A procedure of a message receiving process of the load distribution apparatus 100a is similar to the procedure of the message receiving process of the load distribution apparatus 100 illustrated in FIG. 9. However, the procedure of the request allocation process of step S3 is different.

FIG. 21 is a flow chart of a request allocation process of the second embodiment. The process illustrated in FIG. 21 will be described along with the step numbers.

[Step S41] The allocation server determination unit 140a acquires requests for a virtual server "System" from the message processing unit 130.

[Step S42] The allocation server determination unit 140a identifies the server management table 111b corresponding to the virtual server name "System" stored in the management information storage unit 110a. The allocation server determination unit 140 refers to the threshold L2 of the threshold management table 112 stored in the management information storage unit 110a and compares the load values of the servers of the server management table 111b with the threshold L2.

[Step S43] The allocation server determination unit 140a extracts servers with load values smaller than the threshold L2. The servers B and C are extracted in the example of FIGS. 8 and 19.

[Step S44] The allocation server determination unit 140a refers to the all process completion estimated time of the server management table 111b and identifies the server among the extracted servers in which all processes are most lately completed. Thus, the server B is identified.

[Step S45] The allocation server determination unit 140a determines the identified server as the allocation destination of the requests and notifies the message processing unit 130. The message processing unit 130 outputs the requests, which have the allocation destination determined by the allocation server determination unit 140a as an address, to the communication processing unit 120. The communication processing unit 120 transmits the requests to the server with the address. Thus, the communication processing unit 120 transmits the requests to the server B (Web server 300a).

[Step S46] The communication processing unit 120 receives a completion estimated time message from the Web server 300 that has transmitted the requests. The communication processing unit 120 outputs the received completion estimated time message to the message processing unit 130.

[Step S47] Based on the completion estimated time message acquired from the communication processing unit 120, the message processing unit 130 acquires the all process completion estimated time of the Web server 300a. The message processing unit 130 sends the acquired all process completion estimated time to the server information management unit 150. Based on the sent content, the server information management unit 150 updates the information of the all process completion estimated time of the server management table 111b stored in the management information storage unit 110a.

In this way, after receiving requests for the Web services, the allocation server determination unit 140a compares the load values of the servers and the threshold L2 and extracts Web servers with load values smaller than the threshold L2. The allocation server determination unit 140a determines the Web server, among the web servers with load values smaller than the threshold L2, with the latest all process completion estimated time for the allocation destination of the last request as the allocation destination of the present request.

As a result, similar effects as the first embodiment may be obtained, and the actual load of the servers may be better understood compared to the first embodiment before allocating the requests. For example, even if the processing times of the requests are different, the load of the servers may be appropriately figured out before allocating the requests.

Although the numbers of incomplete requests are set in the field indicating load values, the arrangement is not limited to this. For example, indexes based on CPU load, IO (Input/Output) load, disk load, etc., may be received from the Web servers, and the indexes may be used as the load values. Using the indexes as the load values may better reflect the actual load of the Web servers to determine the request allocation target or the operation/power saving target. If the indexes are set as the load values, the thresholds L1 and L2 set in the threshold management table 112 change accordingly.

As described, the load distribution apparatus 100a selects Web servers with load values smaller than the threshold L2 and determines the Web servers as the allocation destinations of the requests until the load values of the selected Web servers reach the threshold L2. This reduces the load of other Web servers. Therefore, the load of the servers other than the Web server, on which the requests are concentrated, eventually becomes 0 if the usage of the system is small, and the servers may be switched to the power saving state without involving the transfer of the processes, etc.

The load distribution apparatus 100a determines the server, among the servers with load values smaller than the threshold L2, with the latest estimated time of the completion of all processes according to the allocated requests as the allocation destination. Therefore, the actual load of servers may be better reflected before allocating the requests. Even if the processing times of the requests are different, the load of the servers may be appropriately figured out before allocating the requests.

The functions of the load distribution apparatus may be realized by causing a computer to execute a program describing the processing content of the functions. The program describing the processing content may be recorded in a computer-readable recording medium. Examples of the computer-readable recording medium include a magnetic storage device, an optical disk, a magneto-optical recording medium, and a semiconductor memory. Examples of the magnetic storage device include a hard disk drive (HDD), a flexible disk (FD), and a magnetic tape. Examples of the optical disk include a DVD (Digital Versatile Disc), a DVD-RAM, a CD-ROM (Compact Disc Read Only Memory), and a CD-R (Recordable)/RW (ReWritable). An example of the magneto-optical recording medium includes an MO (Magneto-Optical disc).

To distribute the program, for example, a portable recording medium such as a DVD and a CD-ROM recording the program is sold. The program may be stored in a storage device of a server computer, and/or the program may be transferred from the server computer to other computers through a network.

The computer that executes the program stores, for example, the program recorded in the portable recording medium or the program transferred from the server computer to a storage device of the computer. The computer reads out the program from the storage device and executes a process according to the program. The computer may directly read out the program from the portable recording medium to execute the process according to the program. The computer may also execute a process according to a received program every time a program is transferred from the server computer.

The embodiment described above is a preferred embodiment. The present invention is not limited to this but various modifications may be made without departing from the spirit of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A load distribution apparatus comprising: a processor, coupled to a memory, configured to: refer to a load information storage unit that stores load values of a plurality of information processing apparatuses, select one of the plurality of information processing apparatuses based on the load values, by selecting the one of the plurality of information processing apparatuses having a load value smaller than a threshold, and transmit, from the load distribution apparatus to the one of the plurality of information processing apparatuses, all processing requests for the plurality of information processing apparatuses until a load value of the one of the plurality of information processing apparatuses reaches the threshold, wherein the processor is further configured to select the one of the plurality of information processing apparatuses having the load value smaller than the threshold and having the shortest elapsed time from a time that a processing request to the one of the plurality of information processing apparatuses is last transmitted to a present time.

2. The load distribution apparatus according to claim 1, wherein the processor is further configured to refer to an allocation order information storage unit that stores allocation order information indicating an order that the plurality of information processing apparatuses are selected respectively, to identify the one of the plurality of information processing having the shortest elapsed time.

3. The load distribution apparatus according to claim 1, wherein the processor is further configured to refer to an allocation time information storage unit that stores allocation time information indicating the latest times that the plurality of information processing apparatuses are selected respectively, to identify the one of the plurality of information processing having the shortest elapsed time.

4. The load distribution apparatus according to claim 1 wherein the processor is further configured to receive completion time information indicating estimated completion times of processes from the plurality of information processing apparatuses, and store identification information of the plurality of information processing apparatuses in association with the completion time information in a completion time information storage unit, and select the one of the plurality of information processing apparatuses having the load value smaller than the threshold and having a latest estimated completion time based on the completion time information stored in the completion time information storage unit.

5. The load distribution apparatus according to claim 1, wherein the processor is further configured to: receive numbers of incomplete processing requests among the processing requests allocated to the information processing apparatuses from the plurality of information processing apparatuses as the load values, store the identification information of the plurality of information processing apparatuses and the received load values in association with each other in the load information storage unit, select the one of the plurality of information processing apparatuses having the load value smaller than the threshold based on the load values stored in the load information storage unit.

6. The load distribution apparatus according to claim 1, wherein the processor is further configured to: receive values indicating loads of hardware devices in the information processing apparatuses from the plurality of information processing apparatus as the load values, store the identification information in the plurality of information processing apparatuses in association with the received load values in the load information storage unit, and select the one of the plurality of information processing apparatuses having the load value smaller than the threshold based on the load value stored in the load information storage unit.

7. The load distribution apparatus according to claim 1, wherein the processor is further configured to: receive notifications of completion of all the processes according to the processing requests from each of the plurality of information processing apparatuses; refer to a power saving determination threshold storage unit that stores a power saving determination threshold smaller than the predetermined threshold and to the load information storage unit when the all process completion notification receiving unit receives the notifications, determine whether there is an information processing apparatus, other than the information processing apparatuses that are sender of the notifications, with the load value smaller than the power saving determination threshold among the plurality of information processing apparatuses, and instruct the information processing apparatuses that are senders of the notifications to switch to a power saving state if the information processing apparatus with the load value smaller than the power saving determination threshold is present.

8. The load distribution apparatus according to claim 7, wherein the processor is further configured to: refer to the load information storage unit at a specific timing, determine whether there is an information processing apparatus with the load value smaller than the power saving determination threshold among the plurality of information processing apparatuses, and activates activate an information processing apparatus in the power saving state to an operation state if the information processing apparatus with the load value smaller than the power saving determination threshold does not exist.

9. The load distribution apparatus according to claim 8, wherein the processor is further configured to prioritize activating an information processing apparatus with less power consumption in the operation state among the information processing apparatuses in the power saving state if there are a plurality of information processing apparatuses in the power saving state.

10. A load distribution method of a load distribution apparatus, the method comprising: obtaining load values of a plurality of information processing apparatuses; selecting one of the plurality of information processing apparatuses based on the load values, by selecting the one of the plurality of information processing apparatuses having a load value smaller than a threshold; and transmitting, from the load distribution apparatus to the one of the plurality of information processing apparatuses, all processing requests for the plurality of information processing apparatuses until a load value of the one of the plurality of information processing apparatuses reaches the threshold, wherein the processor is further configured to select the one of the plurality of information processing apparatuses having the load value smaller than the threshold and having the shortest elapsed time from a time that a processing request to the one of the plurality of information processing apparatuses is last transmitted to a present time.

11. A non-transitory computer-readable storage medium recording a load distribution program causing a computer to execute processes of: obtaining load values of a plurality of information processing apparatuses; selecting one of the plurality of information processing apparatuses based on the load values, by selecting the one of the plurality of information processing apparatuses having a load value smaller than a threshold; and transmitting, from the load distribution apparatus to the one of the plurality of information processing apparatuses, all processing requests for the plurality of information processing apparatuses until a load value of the one of the plurality of information processing apparatuses reaches the threshold, wherein the processor is further configured to select the one of the plurality of information processing apparatuses having the load value smaller than the threshold and having the shortest elapsed time from a time that a processing request to the one of the plurality of information processing apparatuses is last transmitted to a present time.

* * * * *